(12) United States Patent
Tiwary

(10) Patent No.: US 10,868,773 B2
(45) Date of Patent: *Dec. 15, 2020

(54) DISTRIBUTED MULTI-TENANT NETWORK REAL-TIME MODEL FOR CLOUD BASED ENTERPRISE RESOURCE PLANNING SOLUTIONS

(71) Applicant: SAP SE, Walldorf (DE)

(72) Inventor: Mayank Tiwary, Rourkela (IN)

(73) Assignee: SAP SE, Walldorf (DE)

( * ) Notice: Subject to any disclaimer, the term of this patent is extended or adjusted under 35 U.S.C. 154(b) by 44 days.

This patent is subject to a terminal disclaimer.

(21) Appl. No.: 16/037,275

(22) Filed: Jul. 17, 2018

(65) Prior Publication Data
US 2020/0028795 A1  Jan. 23, 2020

(51) Int. Cl.
| | | |
|---|---|---|
| *H04L 12/927* | (2013.01) | |
| *H04L 12/853* | (2013.01) | |
| *H04L 12/865* | (2013.01) | |
| *H04L 12/14* | (2006.01) | |
| *H04L 12/851* | (2013.01) | |
| *H04L 29/08* | (2006.01) | |

(52) U.S. Cl.
CPC ........ *H04L 47/801* (2013.01); *H04L 12/1439* (2013.01); *H04L 47/2416* (2013.01); *H04L 47/2425* (2013.01); *H04L 47/6275* (2013.01); *H04L 67/12* (2013.01)

(58) Field of Classification Search
CPC ....... H04L 67/10; H04L 63/0272; H04L 5/22; H04L 61/1511; H04L 67/327; H04L 12/1485; H04L 43/0811; H04L 61/1594; H04L 63/083; H04W 24/00; H04W 28/22; H04W 48/08; H04W 72/0446; H04W 72/0466; H04W 72/0473; H04W 72/048; H04W 72/1289; G06Q 10/10
See application file for complete search history.

(56) References Cited

U.S. PATENT DOCUMENTS

| | | | | |
|---|---|---|---|---|
| 2009/0172035 | A1* | 7/2009 | Lessing | ................ G06F 16/284 |
| 2009/0276771 | A1* | 11/2009 | Nickolov | ............ H04L 67/1014 717/177 |
| 2012/0265744 | A1* | 10/2012 | Berkowitz | ......... G06Q 30/0613 707/705 |
| 2013/0121146 | A1* | 5/2013 | Hassidim | ................ H04L 45/22 370/230 |

(Continued)

*Primary Examiner* — Ninos Donabed
(74) *Attorney, Agent, or Firm* — Buckley, Maschoff & Talwalkar LLC

(57) ABSTRACT

Some embodiments are associated with multi-tenant software defined data center network traffic management. A data center computing system may calculate a first value for a first traffic flow, associated with a first user, using a dynamic, distributed, and substantially real-time model. The system may calculate a second value for to a second traffic flow, associated with a second user, using the dynamic, distributed, and substantially real-time model. The system may then dynamically allocate network resources to the first and second traffic flows based on the first and second priorities. Some embodiments may establish a plurality of network device queues and perform queue selection for optimization. According to some embodiments, the first user may be categorized as a premium user while the second user is categorized as an enterprise user.

12 Claims, 13 Drawing Sheets

(56) References Cited

U.S. PATENT DOCUMENTS

| | | | |
|---|---|---|---|
| 2013/0226765 A1* | 8/2013 | Tal | G06Q 40/04 |
| | | | 705/37 |
| 2014/0214496 A1* | 7/2014 | Macbeath | G06Q 30/0283 |
| | | | 705/7.37 |
| 2016/0055499 A1* | 2/2016 | Hawkins | G06Q 30/0271 |
| | | | 705/7.33 |
| 2016/0267411 A1* | 9/2016 | Li | G06Q 10/0637 |
| 2017/0287090 A1* | 10/2017 | Hunn | G06Q 50/18 |
| 2018/0032899 A1* | 2/2018 | Nguyen | G06Q 30/0242 |
| 2018/0084073 A1* | 3/2018 | Walsh | H04L 67/2819 |
| 2018/0174255 A1* | 6/2018 | Hunn | G06Q 50/18 |
| 2018/0315141 A1* | 11/2018 | Hunn | G06F 16/93 |
| 2019/0004837 A1* | 1/2019 | Tiwary | G06F 9/45558 |
| 2019/0073720 A1* | 3/2019 | Tal | G06Q 40/04 |
| 2019/0123973 A1* | 4/2019 | Jeuk | G06N 20/00 |
| 2019/0147400 A1* | 5/2019 | Knight | G06Q 10/0875 |
| | | | 705/26.81 |
| 2019/0339687 A1* | 11/2019 | Cella | G06N 5/046 |
| 2019/0339688 A1* | 11/2019 | Cella | G05B 19/41865 |

\* cited by examiner

DISTRIBUTED MULTI-TENANT NETWORK REAL-TIME MODEL FOR CLOUD BASED ENTERPRISE RESOURCE PLANNING SOLUTIONS

TECHNICAL FIELD

This document generally relates to methods and systems for use with computer devices, including networked computing devices. More particularly, this document relates to a distributed multi-tenant network real-time model for cloud based Enterprise Resource Planning ("ERP") solutions.

BACKGROUND

Network virtualization is used to increase the configurability of network appliances, such as routers, switches, etc., that make up a computing network. Control plane components, often implemented in software, provide instructions to data plane components, such as hardware network appliances. The instructions provide the network appliances with rules for treating incoming packets.

BRIEF DESCRIPTION OF DRAWINGS

The present disclosure is illustrated by way of example and not limitation in the following figures.

DETAILED DESCRIPTION

Figure 1:
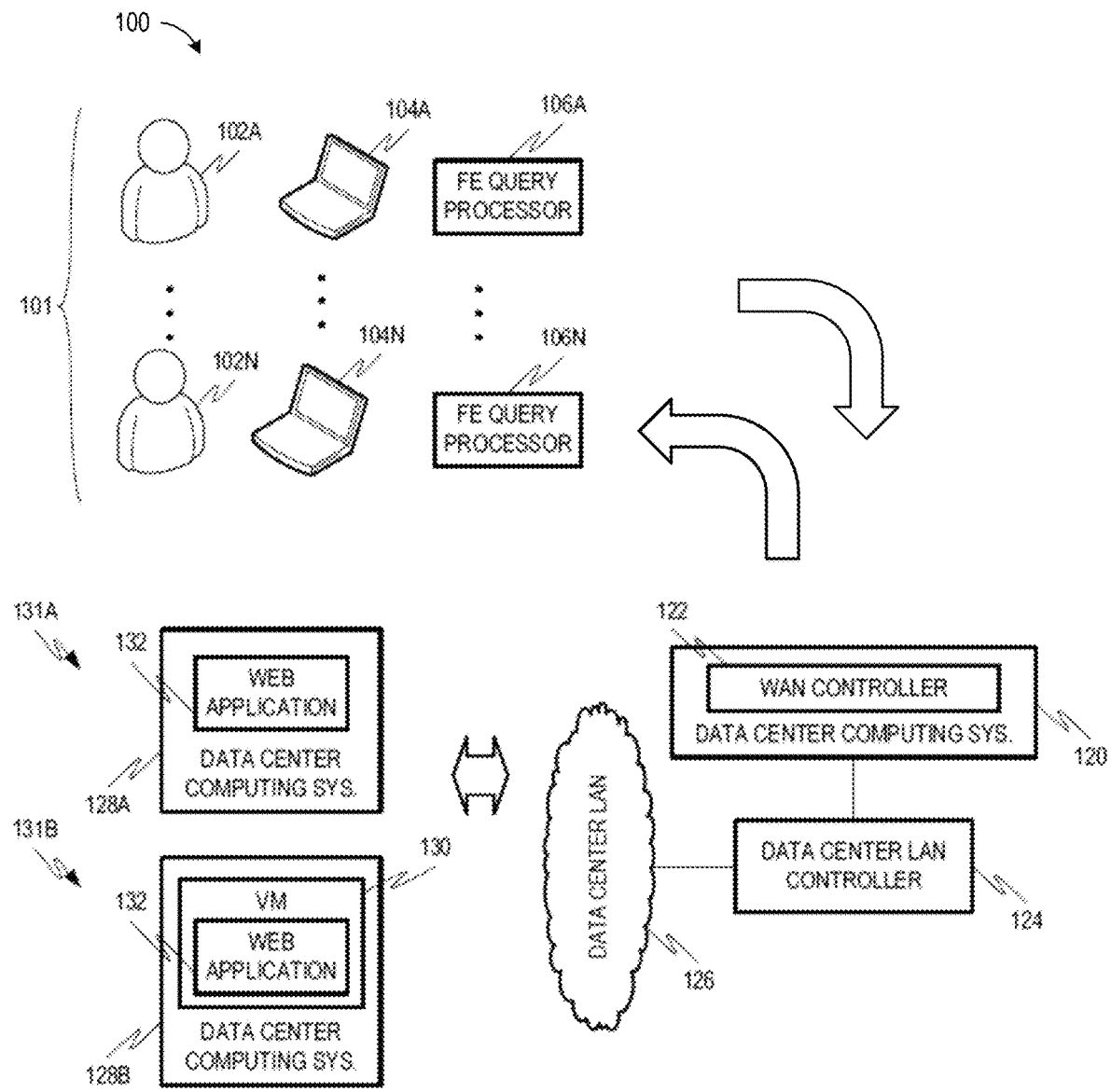
FIG. 1 is a diagram showing one example of an environment for implementing network virtualization for web application queries.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to systems and methods for implementing network virtualization in a web application environment. In a web application environment, a web application executes at a web application machine, which may be a physical or virtual machine. A user of the web application accesses the web application, for example, through a web browser executing at a user computing device. The user, through the web browser, sends a query to the web application requesting that the web application perform a particular processing task. The web application performs the requested processing task and sends a query reply back to the requesting user.

One example of a web application environment is the Business One Cloud suite of applications available from SAP SE of Waldorf, Germany. A user may have a set of queries that the user is permitted to make of the web application. When the web application includes an ERP application, such as the Business One Cloud suite of applications, example queries may include a request to view a purchase order, a request to view an inventory status, a request to add an invoice to an invoice record, etc.

In various examples, users of the web application are associated with different tenants. Tenants include businesses or other organizations that utilize the web application. Users associated with a tenant may include employees, contractors, or other individuals associated with the organization. In one example, a tenant business may utilize an ERP web application to manage its accounts receivable. Employees of the tenant business may be users who are permitted to send queries to the ERP web application, for example, to enter an account receivable, to check the status of certain accounts receivable, etc. ERP and other types of web applications may respond to queries of this type and other types, for example, depending on the particular implementation.

A tenant may maintain internal network infrastructure, such as a tenant LAN, from which users associated with the tenant may access the web application. Accordingly, a user query may traverse several networks between the user's computing device and the web application machine. These networks may include, for example, a tenant LAN maintained by the tenant, a WAN such as the Internet, a data center LAN maintained at the data center that implements the web application machine, etc.

The number and mix of queries directed to a web application may change over time. For example, not all users of the web application are active at any given time. Also, user permissions may change with time. For example, a user that is not permitted to make a particular query at one time may later be permitted to make that query. This means that static network configurations may not always operate at an acceptable level of efficiency.

Various examples described herein implement network virtualization to allow one or more of the networks traversed by web application queries to be configured based on how the web application is being queried at any particular time. This may increase the efficiency of the networks for the web applications.

Users may access the web application from user computing devices that execute a front-end query processor. When the user makes a query, the front-end query processor sends the query to the web application machine that is executing the web application as a query message. The front-end query processor may direct the query message to a particular port of the web application machine, such as a Transport Control Protocol ("TCP") port. The selected port may indicate a type of the query. For example, the front-end query processor may direct query messages including queries of a first type to a first port of the web application machine; it may direct query messages including queries of a second type to a second port of the web application machine, and so on.

Various network controllers may be programmed to modify network appliances of the various networks transporting query messages to direct and prioritize the packets making up the query message. (Packets making up a query message are also referred to herein as query message packets.) For example, a tenant LAN controller may configure network appliances of the tenant LAN to assign query message packets to one of a set of queues. The particular queue to which a query message is assigned may be determined, for example, by the query type (e.g., indicated by the port to which the query message is directed). A WAN controller may configure network appliances of the WAN to select network paths for query message packets, for example, based on query type (e.g., indicated by the port to which the query message is directed, the queue to which the tenant LAN assigned query network packets, etc.) A data center LAN controller may configure network appliances of the data center LAN to direct query message packets, for example, based on query type, user, tenant, etc.

FIG. 1 is a diagram showing one example of an environment 100 for implementing network virtualization for web application queries. The example shown in FIG. 1 shows a single tenant 101, including users 102A, 102N, user computing devices 104A, 104N, front-end query processors 106A, 106N executing at the user computing devices 104A, 104N. The components might communicate, for example, via a tenant LAN and related infrastructure. In various examples, however, additional tenants may be included in the environment 100. Also, in different examples, tenants may include more, fewer, and/or different arrangements of components than what is shown in FIG. 1.

Users 102A, 102N utilize user computing devices 104A, 104N to send queries to a web application 132, which may execute at a web application machine 131A, 131B. Although two users 102A, 102N and user computing devices 104A, 104N are shown, the tenant 101 may include any suitable number of users and/or user computing devices. The user computing devices 104A, 104N may be or include any suitable type of computing devices including, for example, laptop computers, desktop computers, tablet computers, mobile computing devices, etc.

In some examples, when a user 102A, 102N requests a query, a front-end query processor 106A, 106N executing at the user's computing device 104A, 104N generates a query message including the query and sends the query message to the web application machine 131A, 131B. In some examples, the front-end query processors 106A, 106N are or include a script or other interpreted language instructions executed through a web browser executing at the user computing device 104A, 104N.

In some examples, the front-end query processor 106A, 106N determines type of the requested query and directs the query message to a port (e.g., a TCP port) of the web application machine 131A, 131B that corresponds to the query type. For example, query messages including queries of a first type may be directed to the web application machine 131A, 131B at a first port, query messages including queries of a second type may be directed to the web application machine 131A, 131B at a second port, and so on. As a part of sending the query message, the user computing device 104A, 104N may break the query message 111 into query message packets. The query message packets may include various metadata describing the query message, including the port to which it is directed.

The query message is directed to a web application machine. FIG. 1 shows two web application machines 131A, 131B demonstrating different example implementations. For example, web application machine 131A includes a data center computing system 128A that executes the web application 132. Web application machine 131B includes a data center computing system 128B that hosts a virtual machine 130 where the virtual machine 130 executes the web application 132. Data center computing devices 128A, 128B may be or include servers or other suitable computing devices. Data center computing devices 128A, 128B may be positioned at a single geographic location or across multiple geographic locations.

Upon receiving the query message, the web application 132 executes the included query and, in some examples, sends a reply message to the user 102A, 102N including results of the query. Executing the query may include performing any suitable type of processing. For example, queries to an ERP web application may include, for example, database queries regarding stored purchase orders, inventory levels, user records, accounts receivable, etc.

Between the user 102A, 102N and the web application 132, the query message may be communicated by several networks. A tenant LAN may be implemented by the tenant 101. For example, where the tenant 101 is an organization, such as a business, the tenant LAN may be or include an internal network of the organization. A WAN may include the Internet. In some examples, the WAN also includes network components implemented by an Internet Service Provider ("ISP") or other intermediate connection between the tenant LAN and the Internet. A query messages may pass through the WAN to a data center LAN 126 implemented at a data center hosting the web application 132.

The various networks may include various interconnected network appliances. A network controller 124 may configure the network appliances of the network 126 to direct and prioritize the packets making up queries, for example, based on current conditions.

In some examples, the network controller 124 utilize information about user queries that is generated by a tenant backend query processor. The tenant backend query processor may execute at a tenant computing system, which may include any suitable server or other computing device.

In some examples, a WAN controller sends a multi-tenant user query table to the data center controller 124. The multi-tenant user query table may include a list of users, such as users 102A, 102N, and of the different types of queries that that the users are permitted to make. An example of the multi-tenant user query table is provided in TABLE 1 below:

TABLE 1

Example Multi-tenant user query table

| User ID | L1 Query | L2 Query | L3 Query | Tenant Public IP | User Public IP |
|---------|----------|----------|----------|------------------|----------------|
|         |          |          |          |                  |                |

TABLE 1 shows example columns that a multi-tenant user query table may have. Rows of the multi-tenant user query table, also called records, may include fields, with one field for each column. For example, the User ID field of a record may include an indicator of the corresponding user 102A, 102N. The L1 Query, L2 Query, L3 Query fields may include identifiers of different types of queries that the user 102A, 102N is permitted to make. In the example of TABLE 1, three types of queries are classified, L1 queries, L2 queries, and L3 queries. In this example, L1 queries have the highest computational weight, L2 queries have the next highest computational weight, and L3 queries have the lowest computational weight. In various examples, however, different numbers and arrangements of query types may be used.

A multi-tenant user query table record in the example of TABLE 1 may also include a tenant public IP field that indicates an address of the tenant 101 with which the user 102A, 102N is associated. For example, the tenant public IP field may indicate an Internet Protocol ("IP") or other suitable network address of an edge network appliance of a tenant LAN. The user public IP field may include an IP or other suitable network address of the user 102A, 102N. For example, the user public IP field may indicate a network address of the user computing device 104A, 104N to which a reply should be directed. In some examples, some or all of the fields of the multi-tenant user query table may be reflected in the query message packets making up a query message, such as the query message. For example, user ID, tenant public IP and user public IP may be included in packet headers. The type of a query may be reflected in the packet header too, for example, by the TCP port or other port to which the packet is directed. For example, the front-end query processor 106A may direct query messages including L1 queries to a first port, query messages including L2 queries to a second port, and query messages including L3 queries to a third port.

The data center LAN controller 124 may receive the multi-tenant user query table from a WAN controller. The data center LAN controller 124, in some examples, executes at one or more of the data center computing devices 128A, 128B. The data center LAN controller 124 may configure network appliances of the data center LAN to direct query message packets, for example, based on query type, user, tenant, etc. In some examples, the data center LAN controller 124 is also programmed to upgrade and/or downgrade query message packets from a particular user 102A, 102N, for example, depending on the user's activity level (e.g., how many queries the user 102A, 102N has sent within a given time period).

Figure 2:
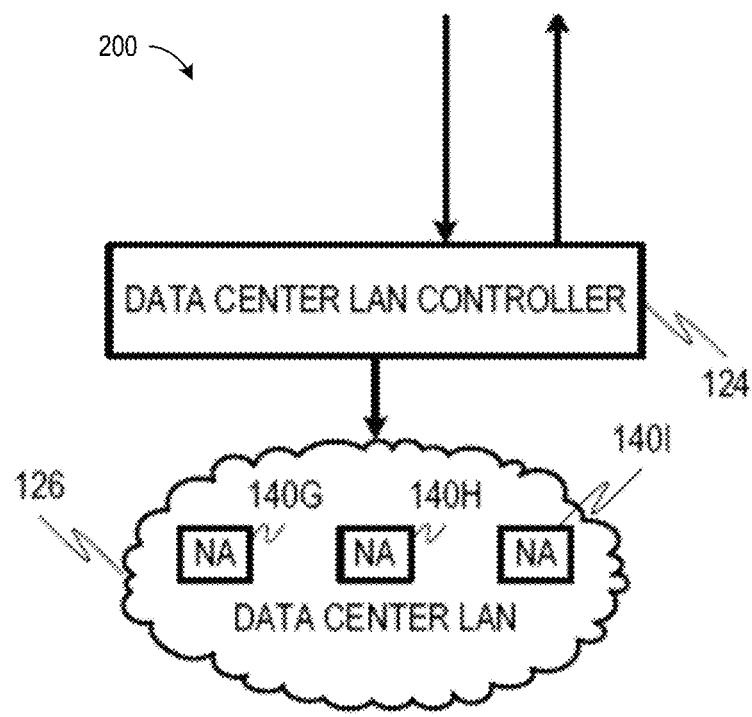
FIG. 2 is a diagram showing another example of the environment of FIG. 1.

FIG. 2 is a diagram showing another example of the environment 100. For example, FIG. 2 shows components for supporting queries from multiple example tenants, including various network appliances 140G, 140H, 140I that are components of the data center LAN network 126, as shown. Although three network appliances 140G, 140H, 140I are shown, in practice the network 126 may include more or fewer than three network appliances. The network appliances 140G, 140H, 140I may be any suitable network hardware for processing packets, such as query packets. For example, some or all of the network appliances 140G, 140H, 140I may be or include switches, routers, hubs, etc.

The network appliances 140G, 140H, 140I may accept flow entries from the respective data center LAN controller 124. A flow entry may include packet identification data and rule data. Packet identification data may identify a packet or type of packet and the rule data may describe how the network appliance 140G, 140H, 140I is to process the packet.

Example packet identification data may include, for example, a user identifier of the sender, an IP or other network address of the sender, a Media Access Control ("MAC") address of the user computing device of the sender, a destination name, a destination IP or other network address, an IP or other address of the host or subnet from which the packet originated, a port number, a queue identifier, etc. In some examples, some or all of the packet identification data may be written to a header of the packet such that the network appliance 140G, 140H, 140I may determine whether any particular packet meets the packet identification data by comparing the packet identification data to the packet header.

Rule data may describe an action or actions that a network appliance 140G, 140H, 140I is to take with respect to a packet identified by packet identification data. Example actions include, sending the packet to another specified network appliance 140G, 140H, 140I, sending the packet to the data center LAN controller 124, adding the packet to a particular queue, queueing the packet, etc.

For example, a flow entry to a network appliance 140G, 140H, 140I may specify that all query packets from a particular user 102A, 102N to a particular port are to be assigned to a particular queue. Another flow entry to a network appliance 140G, 140H, 140I may specify that all query packets assigned to a particular queue are to be routed to a specified other network appliance 140G, 140H, 140I. In some examples, flow entries for the network appliances 140G, 140H, 140I are configured according to a Software Defined Network ("SDN") protocol, such as OpenFlow protocol maintained by the OpenFlow Foundation.

Figure 3:
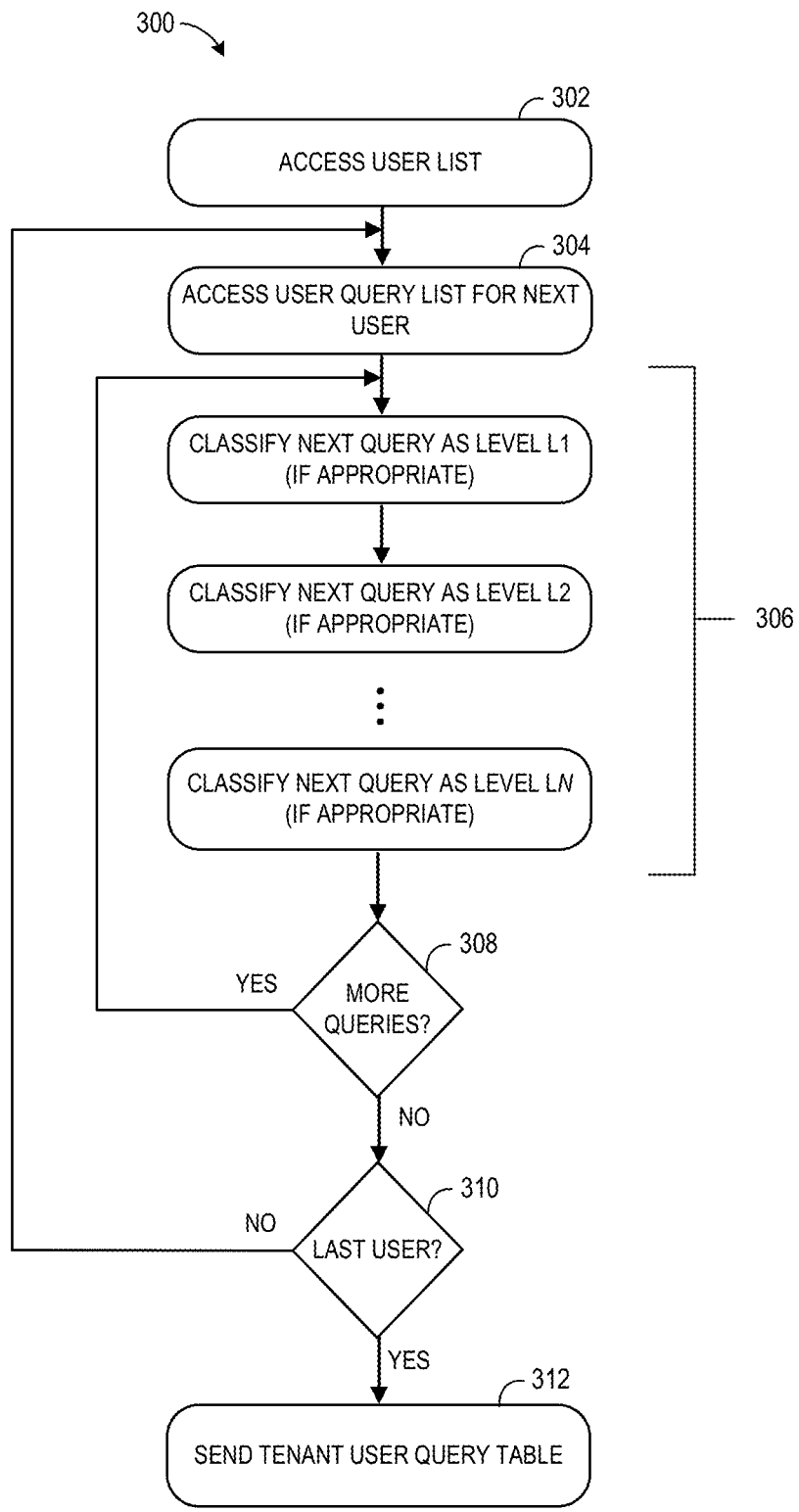
FIG. 3 is flowchart showing one example of a process flow that may be executed by a tenant backend query processor, such as one of the tenant backend query processors to classify the queries that requested by different users.

FIG. 3 is flowchart showing one example of a process flow 300 that may be executed by a tenant backend query processor to classify queries requested by different users. The process flow 300 is described with respect to a tenant backend query processor for tenant 101, although the process flow 300 may be executed with respect to any of the tenant backend query processors at any of the tenants. In some examples, a tenant backend query processor may execute the process flow 300 periodically. For example, users may change with time and the queries permitted to certain users may also change with time.

At operation 302, a tenant backend query processor may access a user list. The user list may indicate the users associated with the tenant 101 who are permitted to make queries. The user list, in some examples, may also indicate one or more queries that each user is permitted to make. In the example of FIG. 1, then, the backend query processor accesses a user list that indicates the user 102A and the queries that the user 102A is permitted to make. The user list may also indicate the user 102N and the queries that the user 102N is permitted to make. In some examples, the user list is received from an identity management system.

At operation 304, the tenant backend query processor may retrieve a permitted query list for a current user from the user list. The permitted query list may indicate queries that the current user is permitted to make. The tenant backend query processor may retrieve the permitted query list from the user list, from an identity management system or from any other suitable system. At operation 306, the tenant backend query processor may classify the next query on the permitted query list. As illustrated in FIG. 3, the query may be classified at 306 as being a query type associated with one of level L1, L2, through LN as appropriate. Note that the query might be classified into any number of types or levels—for example, the total number of levels might dynamically depend on a data-center team input. Classifying the query may include assigning the query to one of a set of query types, for example, based on computational weight. In different examples, the tenant backend query processor may classify queries into any suitable number of types, such as two types, three types, etc. As queries are classified, the tenant backend query processor may generate a tenant user query table, for example, similar to TABLE 1 above but including records for users considered by the backend query processor.

At operation 308, the tenant backend query processor may determine if there are any queries from the permitted query list accessed at operation 304 that have yet to be classified. If yes, the tenant backend query processor may return to operation 306 and classify the next query for the considered user. If no permitted queries for the user remain (e.g., if all permitted queries for the user have already been classified), then the tenant backend query processor may, at operation 310, determine if the current user is the last user from the user list accessed at operation 302. If not, the tenant backend query processor may return to operation 304 and access a permitted query list for the next user from the user list. If the current user is the last user, the tenant backend query processor may, at operation 312, send the tenant user query table, for example, to a WAN controller. The tenant backend query processor 112 may generate multi-tenant user query table update data at operation 312.

Recent advances in Software Defined Networking ("SDN") and OpenFlow protocol add a higher degree of abstraction to the control layer for different kinds of networks. With SDN, the behavior or state of the network can be changed in real-time, which makes it more suitable for a wide variety of IoT applications. As used herein, the phrase "SDN" may refer to, for example, an approach to cloud computing that facilitates network management and enables programmatically efficient network configuration to improve network performance and/or monitoring. Moreover, the phrase "OpenFlow protocol" may refer to a communications protocol that provides access to a forwarding plane of a network switch or router (e.g., to let network controllers determine a path of network packets across a network of switches).

One function of datacenter networks is to provide multi-tenancy for IoT traffic. In multi-tenancy at network layer, the network dynamically provisions network resources for traffic coming from different categories of users. For example, users may use a variety of IoT applications which do direct transactions of Enterprise Resource Planning ("ERP") software provided to the user through a Software as a Service ("SaaS") offering. To encourage multi-tenancy at a network layer, embodiments described herein may utilize a dynamic and distributed pricing model. The model may, for example, use demand-supply principles to evaluate prices for every transaction made by IoT devices on ERP. Further, a scheduler may dynamically assign ERP-IoT flow entries on datacenter network devices to specific queues to help maintain the overall utility of the data center.

A Service-Level Agreement ("SLA") is a commitment between a service provider and a client. Various aspects of a service, such as quality, availability, responsibilities, etc., may be agreed upon by a service provider and a user. To help meet network SLAs, a SDN may uses a programmable control plane that is logically centralized but physically distributed. Note that SDN and its principles are widely followed by cloud service providers to enhance their Infrastructure as a Service ("IaaS"), Platform as a Service ("PaaS") and SaaS offerings.

With the expansion of the IoT market, service providers may implement highly elastic mechanisms that can accommodate increased user traffic beneath an underlying network. One way to achieve strict network based SLAs for IoT traffic is to implement a network based multi-tenant solutions. Note that may manufacturing locations use ERP to handle core business processes. Moreover, a manufacturing location might use a wide variety of IoT devices to facilitate automation. As a result, IoT traffic may directly make transactions in the ERP running in data centers. This IoT integration with ERP can cause a series of overwhelming network traffic on Virtual Machines ("VMs") executing the ERP. This overwhelming network traffic can make it difficult to maintain the SLA for IoT traffic. For example, IoT devices running at a manufacturing location (or with an end-user) might make millions of transactions with core cloud ERP systems in a single day. Commonly seen uses associated with this ERP-IoT scenario include monitoring applications, bar-code scanning, automated sensing material movement, etc. Some applications may be manually user triggered while others are associated monitoring applications that indirectly make user operations to direct an ERP transaction.

Some embodiments described herein provide a distributed real-time pricing model that evaluates prices for every ERP-IoT traffic flow associated with a transaction in an ERP backend. The prices may be assigned, for example, based on demand and supply principles. If the network resource supply is less than the current demand, then prices may even be negative in magnitude (meaning the service provider must pay back the user). To manage the losses incurred by the service provider, a queue scheduler may dynamically assign ERP-IoT flow entries to specific queues. The aim of the scheduler may be to maintain an overall price and resource utility of the service providers. In particular, some embodiment may provide:

ERP-IoT traffic flow scoring based on the overall response time and average amount of data the flow sends to ERP.

A demand-supply based distributed pricing model for multi-tenant network architecture (by configuring multiple rate limited queues on egress and ingress ports of OpenFlow devices). Further, different mechanisms for evaluating prices for premium and enterprise users may be implemented in the pricing model.

A traffic flow scheduler may help meet basic SLAs for IoT traffic and maintain a service provider's utility in terms of users elastic demand and resource availability.

A data center network running ERP systems may be represented by graph $\mathcal{G}$, such that $\mathcal{G} = \{v, e, w\}$. Here $\{v = v_1, v_2, v_3, \ldots v_n\}$, where n is the number of network devices. The data center switches are interconnected to each other through full-duplex links. The same links may be represented by edges $e = \{e_1, e_2, e_3, \ldots, e_k\}$, where k represents the total number of edges. Moreover, $w = \{w_1, w_2, w_3, \ldots, w_k\}$ may be used to represent the bandwidth of each edge or link, where $w_k$ is the bandwidth of the link or edge $e_k$.

Users of a cloud based ERP based service provider are represented by set C which accesses ERP services through data center network $\mathcal{G}$. The set C is represented as $\{c_1, c_2, c_3, \ldots, c_m\}$, where m is the total number of users. The user set may be divided into premium and enterprise users, where set C* contains all premium users. Thus, the set C* always follows C*⊆C.

Each user in C has deployed a set of IoT devices (e.g., at a manufacturing location or with users). The user's IoT devices may generate and fire many traffic flows for the ERP services running on the data center VMs. Generally, the flows from IoT devices may be generated whenever a sensor captures or senses an event. These flows are then sent to the ERP VM using Representational State Transfer ("REST") or other form of a web service. For example, when an engineer scans a bar code flows may be generated to a cloud ERP that cause an ERP transaction to create a Bill of Material ("BoM") document. As another example, an employee who records time may cause sensors to generate an ERP transaction to create a Goods and Service Receipt ("GSR") document associated with a Purchase Order ("PO"). In some cases, once these flows are fired from the IoT gateway (e.g., from a manufacturing location or a user site), the number of packets transmitted may depend upon the nature of the sensor device. For example, each flow from a bar code scanner might usually contain from 10 to 15 packets. This set of packets constitute an IoT-ERP traffic flow that causes a transaction in the ERP backend. Based on the computational intensiveness or the execution response time (e.g., to execute the respective query or IoT-ERP traffic flow), each flow may be assigned a calibrated number. In some embodiments, the flow scoring may be performed using a response time millisecond ("ms") attribute which includes a waiting time for work-process, ERP business logic processing time, an enqueue time for obtaining database locks, and a roll wait time.

Every OpenFlow device in $\mathcal{G}$ may have queues $Q=\{q_1, q_2, q_3, \ldots, q_p\}$ assigned to each active physical port (including ingress and egress buffers). The configured queues may be limited by maximum and minimum data transmission rate $R=\{r_1, r_2, r_3, \ldots, r_p\}$. According to some embodiments, each queue might also be associated with a maximum number of packets that can be accumulated within a buffer without loss as represented by $D_{max}=\{d_1, d_2, d_3, \ldots, d_p\}$.

A real-time distributed pricing model may periodically ($t \in \mathcal{T}$, where $\mathcal{T}$ is a set of time slots in a day) evaluate the scores of ERP-IoT traffic flows based on response time. Dynamic prices may then be evaluated against the traffic flows from IoT gateways based on the real-time demand and supply in terms of required bandwidth. According to some embodiments, the service providers may aim to maximize utility by scheduling the ERP-IoT traffic flows to optimal queues Q based on the real-time prices and average amount of data transfer by the IoT devices.

As used herein, the phrase "multi-tenant network" may refer to, for example, a data center network (shared by all users that consume the IoT-based cloud services) where multiple queues may be created on each physical port of network devices for dynamic allocation of network resources to the traffic flows based on queue configurations. The traffic flows may, according to some embodiments, be dynamically assigned to queues based on the flow characteristics, type, and/or priority of the user. In the process of maximizing the network resources utility, the network bandwidth utilization may also be maximized with respect to the scores of traffic flows and the type of user (e.g., premium or non-premium/enterprise user).

ERP solutions may run as part of an on-premise system but maintaining ERP servers on-premise can be costly and extra overhead may be incurred for maintenance. As part of SaaS offerings, an ERP provider may be moved to a cloud where the ERPs run as a separate instance on VMs. In some ERP cloud architectures, the complete ERP suite is installed on a single VM (and a database may run as a separate instance). A suite may also have modules for front end services and business logic may be compiled using a Business Object Processing Framework ("BOPF"). Traditional on-premise ERP systems are different from cloud based ERP systems in terms of architecture. For example, end-to-end integration systems exist in cloud based ERPs where the integration solution helps implement real-time data consistency across geographically deployed ERPs.

In IoT-ERP scenarios, sensor nodes may send data to gateways deployed at sites. The gateway may then consume IoT-ERP services using REST APIs or web-services. The data sent to a ERP VM via REST consumption may be converted to ERP transactions via a middle layer (e.g., under a process layer of ERP and usually executed on same ERP VM). If the IoT scenario is substantially large, a middle layer may run as a separate instance on a different VM. The middle layer process may convert the sensor data to useful ERP transactions (e.g., via thresholding techniques or machine learning approaches for conversion of the REST call ERP transaction). This conversion module may also store the transactions in a buffer in case a transaction fails (e.g., due to an ERP inconsistency). Finally, the converted ERP transactions sent by the middle layer may be translated into the relevant core ERP operations (e.g., create, update, or delete) by the service framework based on the defined business logic. The BOPF framework may delegate these operations to dedicated methods of the corresponding service provider interfaces. The query system may use a Fast Search Interface ("FSI") which has a secondary persistent storage of the data being requested. This secondary persistence may be associated with, for example, a database that resides or runs on another VM (or sometimes on a standalone system).

Figure 4:
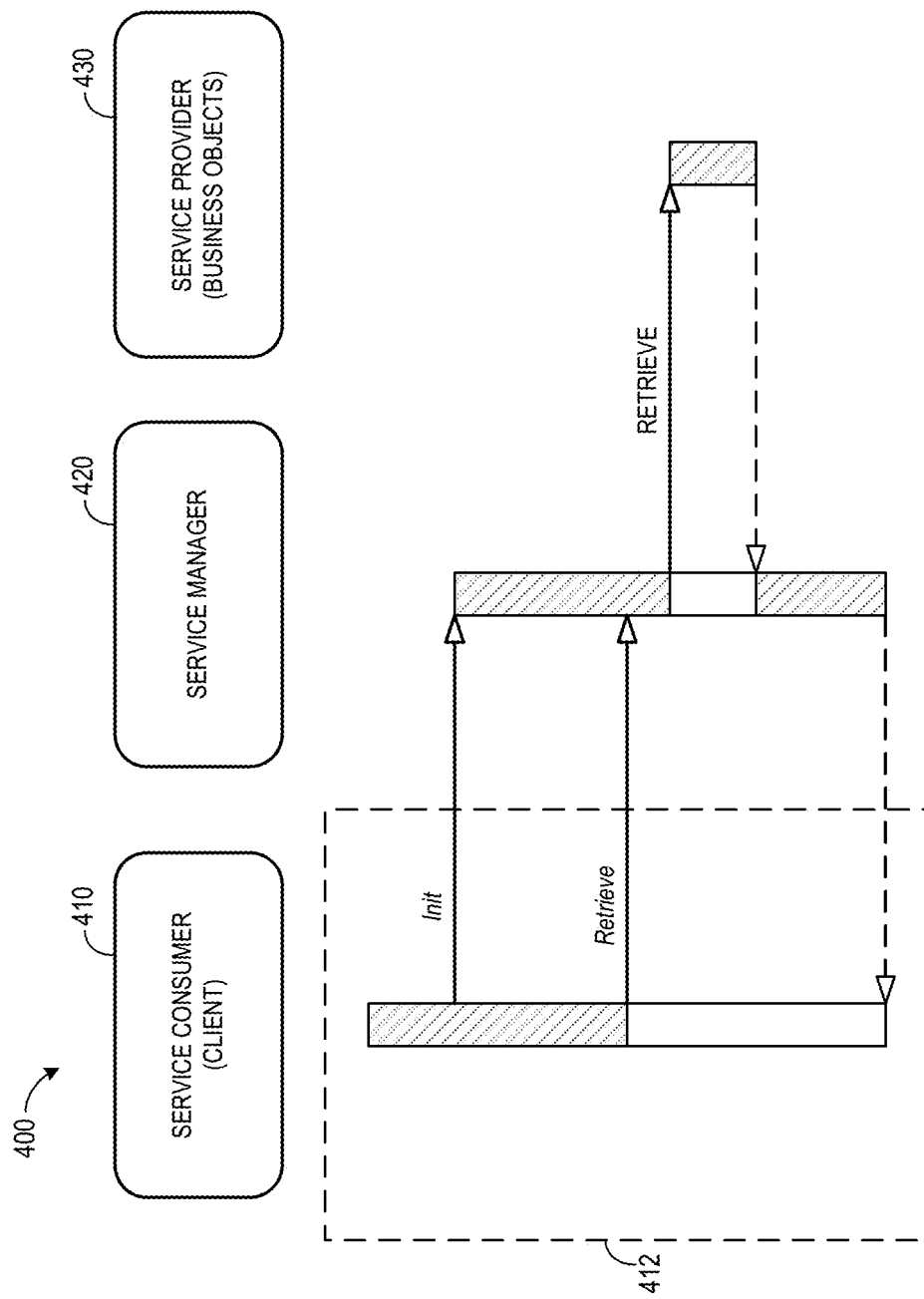
FIG. 4 is a sequence diagram of a user request from a UI to a backend layer.

As illustrated in FIG. 4, a system 400 may include a service consumer 410, a service manager 420, and a service provider 430. In particular, the system 400 illustrates the steps by which an IoT-ERP transaction sent by a middle layer is converted to ERP core services. As shown in the sequence diagram, the transaction is responsible for fetching data from ERP. The service manager module 420 initially receives the call from a middle layer and then forwards the specific call to service or BOPF layer where the actual filters for business logic reside.

Figure 5:
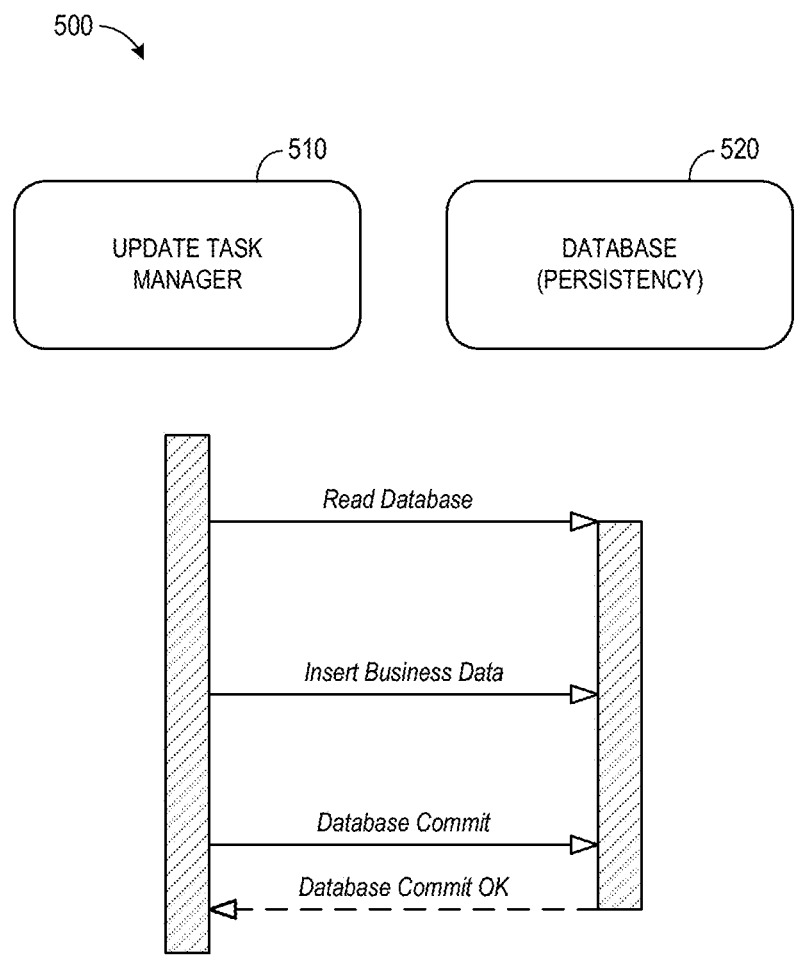
FIG. 5 is a sequence diagram of a backend layer request to a database layer.

After the business logic filters, the service layer forwards the query to a database layer (from a backend VM to a database system) from a task manager layer (note that the task manager may also be a part of a BOPF layer) as shown by the system 500 of FIG. 5. A database 520 runs as a separate VM from an update task manager 510 (or even as a standalone machine). Hence, every IoT device data is eventually converted to a ERP query. The ERP query or DB operations might usually generate, for example, a sequence of 8 to 16 packets from an ERP VM which has access to the database 520 (and then a response is received from the DB layer).

When flows are fired from IoT gateways, the number of packets (or length of the flow) may be estimated based on the amount of data transmitted per transaction (apart from the maintenance traffic). Hence, an algorithm may cover the optimal flow-to-queue scheduling based on an average amount of data transfer by sensors that generate the same traffic flow. Also, in IoT-ERP scenarios there are traffic flows where the number of packets in the flow is not very high and cannot be predicted before-hand. Usually, in case of monitoring applications, the IoT may generate traffic flows in a periodic manner and in a non-periodic manner when the IoT device senses data that is based on human interaction. Each flow (irrespective of its periodic or non-periodic nature) may be associated with a calibrated score based on the computational intensiveness and/or execution response time associated with executing the respective query.

The response time for a ERP-IoT query might include a waiting for work process time, a processing time (Advanced Business Application Programming ("ABAP")-backend), a generation time, a load time, a roll time (for rolling in work data), a database time, an enqueue time for logical locks, a roll wait time, etc. When DataBase ("DB") procedure is used between an application server and a live cache, a new "DB procedure" component may also be added to the response time. Note that the amount of data being transferred may be an important aspect of scoring traffic flows (e.g., because it may be associated with an overall IoT-ERP flow length).

A user's C IoT device may have access to a wide range of ERP queries and each IoT traffic flow ($\mathcal{F} = \{f_1, f_2, f_3, \ldots, f_q\}$) may be mapped to a ERP query. For all of a user's queries—based on maximum and minimum response times and an average number of packets sent in one traffic flow (which may be directly proportional to an average amount of data transfer from a sensor node when making a successful ERP transaction) for all queries—a traffic flow $\mathcal{F}$ may be assigned a score $\alpha$ ($\alpha = \{\alpha_1, \alpha_2, \alpha_3, \ldots, \alpha_q\}$) such that the score ranges from 0 to 10. Where a is the average of $\beta$ and $\gamma$, $\beta$ represents the normalized response time for a query i, and $\gamma_i$ represents the normalized average packets in a traffic flow. According to some embodiments, the scores assigned to each ERP-IoT traffic flow may help generate real-time prices and optimal flow scheduling in multi-tenant networks.

According to some embodiments, a background job running in an ABAP back-end system may calculate a response time for a given query. As per BOPF framework in ABAP systems, a response time may be noted for every query that execute using minimal reporting scripts. Note, however, that the background job may separate the IoT queries and user fired queries. Then, based on the response time, the system may calculate a for a given flow $\mathcal{F}$. The query scoring may be performed relatively frequently (or in substantially real-time) because the computational intensiveness of ERP-IoT queries may change over time. For example, when the IoT device sends an initial employee time recording to ERP, the system may create a single GSR document. Subsequently, many GSR documents may be created as a result of other employees recording time. As a result, creation of a new GSR for the same project or PO may become a computational intensive task.

It may be difficult for the SDN controller to identify traffic flow against each query. Hence, the front-end (e.g., a gateway device at a user site) may fire each query on a specific TCP port based on its score. For example, when flows are scored on a scale from 0 to 10, the system may create ten TCP ports to identify each flow (with a one-to-one mapping between the score and the TCP port). That is, if a flow is scored 4.33 it may be mapped to the fourth available TCP port. OpenFlow devices installed in the user or user site and data center may have already installed the flow entries with all specific TCP ports. For example, an office the gateway may send IoT data using REST to consume access ERP services with URL xxx.com. Moreover, the system may have ten TCP ports available to identify the flows. The network controller adds all ten flow entries in the flow table from every IoT device gateway on the user site OpenFlow devices. Similarly, the controller adds all the ten flow entries in the flow table of OpenFlow devices in the data center per users global IP address. The data center OpenFlow devices have ten flow entries per global IP address of user. Now for these ten flow entries the queue assignment is to be done such that it leads to maximum network resource utilization. Usually, one flow entry on the data center OpenFlow device may be responsible for receiving ERP traffic flows from multiple IoT device gateways (as a group of IoT gateways in an office location may have one public IP Address and Network Address Translation ("NAT") occurs at the gateway device with the private IP addresses). Further, in the ERP OpenFlow table, there can be ten flow entries created with a source IP address as the public IP address and destination IP address as an ERP global IP address.

The demand of ERP-IoT traffic may be defined by $D_{max}(\cdot)$ as follows:

$$D_{max}(\cdot) = \frac{\alpha_i}{10} \cdot p = d_i \quad (1)$$

Here $\alpha_i$ is the real-time score assigned to the specific ERP-IoT query flow $\mathcal{F}$, and p is the total number of queues created in the network devices of a multi-tenant network. The demand of the query may be fixed until the response time for the specific query changes in backend (because in ERP applications the response time often depends upon other business attributes). The function $D(\cdot)$ returns the maximum data rate or bandwidth assigned to $d_i(\mathcal{R})$.

The demand from each active ERP-IoT device at time t can be represented using a vector $d_i$ as follows:

$$d_i = \{d_i^1, d_i^2, d_i^3, \ldots, d_i^T\} \quad (2)$$

where i represents the user (any user either premium or enterprise), and T is the total set of IoT devices used by user for performing automated ERP-IoT transactions. Based on the total industrial IoT devices deployed at users site or location, each user has max demand of bandwidth which is represented as follows:

$$d_i^{min} \leq d_i \leq d_i^{max} \quad (3)$$

Now (per the demand and supply principles), the total bandwidth demand should always be less than bandwidth availability in multi-tenant network.

$$\sum_{k=0}^{T} d_i^k \leq D_a \quad (4)$$

Here $D_a$ represents the bandwidth availability in multi-tenant network.

According to some embodiments, price may be allocated to ERP-IoT traffic flows based on demand-supply and user characteristics. Hence, for every premium and enterprise users, prices for each ERP-IoT traffic flows may be represented by:

$$P_{prem} = \{P_{prem}^1, P_{prem}^2, P_{prem}^3, \ldots P_{prem}^T\} \quad (5)$$

Similarly, for enterprise (non-premium) users, the prices may be represented by:

$$P_{ent} = \{P_{ent}^1, P_{ent}^2, P_{ent}^3, \ldots P_{ent}^T\} \quad (6)$$

Also, $$P_{prem} > P_{ent} \quad (7)$$

The service providers objective of maximizing network resource utility (depending on real-time demand and supply) may be modeled as the following maximization problems:

$$\text{Maximize: } U(\cdot) = \sum_{c \in C} \sum_{k=0}^{T} d_i^k \cdot p^k \quad (8)$$

subject to constraints:

$$\sum_{c \in C}^{m} \sum_{k=0}^{T} D_i \leq D_a \quad (9)$$

$$\sum_{c \in C}^{m} d_i > 0 \quad (10)$$

The demand-supply prices for all the ERP-IoT queries of a user may be calculated based on load fraction. A load fraction for any given query may be defined using $LF(\alpha_i)$:

$$LF(\alpha_i) = \frac{\alpha_i}{\sum_{k=1}^{|\beta|} \alpha_k} \quad (11)$$

where $|\beta|$ represents the total distinct query set for all of current active IoT devices of a given user C. The load fraction $L(\alpha_i)$ may determine the impact caused by a query of score $\alpha_i$ with respect to all other queries in terms of its demand.

According to some embodiments, a fixed base price $P_b$ is assumed for consuming any service. The base price may be different for different ERP-IoT traffic flows and may remain the same across premium or enterprise users. The utility maximization problem as stated in Eqn. (8) may be solved using a linear optimization solution approach (while checking all the constraints). A data center network controller may evaluate the real-time price $P_t$ of a ERP-IoT traffic for an enterprise user using:

$$P_t = P_b + L(\alpha_i) + \tan^{-1}\{e^{\lambda} - \gamma\} \quad (12)$$

In Eqn. (12), $\lambda$ is the difference between demand and supply (defined below). The function $\tan^{-1}\{e^{\lambda} - \gamma\}$ always returns a value between 1.5 and 0.7 based on the difference between demand and supply or $\lambda$. Note that $\gamma$ may represent a pre-determined constant used to scale scores.

$$\lambda = \left\{ \left\{ w_k - \sum_{i=1}^{q} r_i \cdot f_k \right\} - d_i \right\} \quad (13)$$

In Eqn. (13), $w_k - \sum_{i=1}^{q} r_i \cdot f_k$ is the actual bandwidth availability or supply at a multi-tenant switch. Note that the price computed using Eqn. (12) may be applied when demand is less than supply. When demand is more than supply, the service provider must pay penalty and may use the following:

$$P_{ent} = P_b - L(\alpha_i) + \tan^{-1}\{e^{\lambda} - \gamma\} \quad (14)$$

Further, to calculate the demand-supply prices for ERP-IoT flows of a premium user (C*), the system may use the following non-linear equation:

$$P_{prem} = P_{ent} + a \cdot \{d_i\}^2 + b \cdot \{d_i\} + c \quad (15)$$

The $P_{prem}$ prices are non-linear in nature and based on the demand it increases non-linearly. The above used non-linear Eqn. (15) may be used to give a sharp increase in price as compared to an enterprise user. In Eqn. (15), the values of a, b, and c may be chosen for scaling the premium prices in substantially real-time. Similarly, when the demand is more than supply, the prices are also reduced and computed as:

$$P_{prem} = P_{ent} - a \cdot \{d_i\}^2 + b \cdot \{d_i\} + c \quad (16)$$

Note that the prices can become negative such that the service provider must pay back to user. However, the core flow scheduler's aim is to maximize the utility, and this will try to balance the prices in the next time slot t+1 by assigning a queue with a more favorable data rate.

Figure 6:
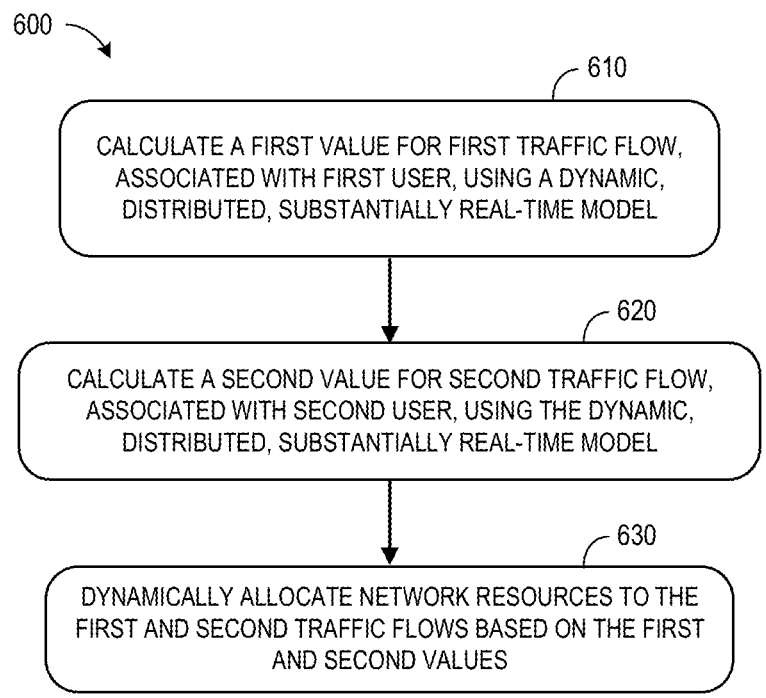
FIG. 6 is a pricing model method in accordance with some embodiments.

Thus, some embodiments described herein may use a pricing model to facilitate multi-tenant software defined data center network traffic management. FIG. 6 illustrates one such method 600. At 610, a data center computing system (including at least one processor and at least one memory in communication with the at least one processor) may compute a first value for a first traffic flow, associated with a first user, using a dynamic, distributed, and substantially real-time model. For example, a pricing model might be used to computer a first price value for the first user (e.g., data center customer). The software defined data center network may be, for example, associated with an ERP solution deployed via a cloud environment and provided using SaaS. Moreover, the first and second traffic flows may be associated with Internet of Things ("IoT") applications executing direct transactions of the ERP solution. In addition, the dynamic, distributed, and substantially real-time model may be a pricing model that utilizes an overall response time and an average amount of data associated with each traffic flow.

At 620, the system may calculate a second value (e.g., a price value) for a second traffic flow, associated with a second user, using the dynamic, distributed, and substantially real-time model (e.g., a pricing model). According to some embodiments, the first user comprises a premium user and the second user comprises an enterprise user (and different mechanisms may be utilized to evaluate values for the first and second users).

At 630, the system may dynamically allocate network resources to the first and second traffic flows based on the first and second values in accordance with any of the embodiments described herein. For example, a traffic flow scheduler may execute a queue selection algorithm to meet SLAs responsive to elastic user demand and resource availability using price values. As a result, the dynamic allocation of network resources may improve network bandwidth utilization at the network layer with respect to multi-tenancy.

A more detailed implementation of the method 600 of FIG. 6 according to some embodiments will now be provided. In accordance with current SDN L2 architectures, it may be difficult to track each and every ERP-IoT transaction at the network control layer from a user's manufacturing location. For example, in data center SDN edge devices a single flow entry may take query transaction traffic from multiple IoT gateways. Some approaches may associate timers with each flow entry such that when a transaction is completed, the timer expires. This method, however, may introduce additional Quality of Service ("QoS") loss due to the flow setup time for each IoT transaction. Hence, some embodiments described herein do not change the existing flow set up architecture (but instead may check the total ERP-IoT transactions done against a flow entry from the ERP-backend layer).

Individual prices may be calculated against each flow-entry at a time slot t and then a scheduler may assign these flow entries to appropriate queues (such that the utility of a service provider is maximized). According to some embodiments, Algorithm 1 runs on a control layer and is used to evaluate the prices of every flow entry for ERP-IoT traffic:

| Algorithm 1: Flow Entry Price Calculation | | |
|---|---|---|
| | Inputs: | ERP-IoT Flow Entry set on switch set S – f ∈ F |
| | | ERP-IoT transaction list L∀F |
| | | Current Queue assignment list q∀F |
| | Outputs: | Prices of each flow entry P∀F |
| 1 | P = NULL | |
| 2 | for Core and Leaf Switches s ∈ S do | |
| 3 |    F = get_flow_entries(s) | |
| 4 |    for f ∈ F do | |
| 5 |       q = get_assigned_Queue(f) | |
| 6 |       L = get_recent_transactions(F,t) | |
| 7 |       for l ∈ L do | |
| 8 |          if Demand(q)≤Supply then | |
| 9 |             p=Evaluate Price using Eqn. 12 | |
| 10 |             P[s][f] += p; | |
| 11 |          else | |
| 12 |             p=Evaluate Price using Eqn. 14 | |
| 13 |             P[s][f] += p; | |
| 14 | return P; | |

Note that Algorithm 1 iterates through all core or leaf switches entries installed on OpenFlow devices in a data center and calculates prices as appropriate. This algorithm may be, for example, executed by the data center controller at the end of every time slot t.

The overall utility of service providers may be defined based on demand, supply, base prices, and actual evaluated prices. Hence, the overall decision variable y can be represented as follows:

$$y = \{d_t, S, P_b, P\} \quad (17)$$

Considering y, the overall decision matrix used to schedule queue for a given flow entry can be represented as follows:

$$\begin{bmatrix} d_{t1} & d_{t2} & d_{t3} & \ldots & d_t \\ S_{t1} & S_{t2} & S_{t3} & \ldots & S_t \\ P_{b1} & \vdots & \vdots & \ddots & \vdots \\ P_{f1} & P_{f2} & P_{f3} & \ldots & P_{fk} \end{bmatrix}$$

The overall decision rule can then be represented as $$D(y) = \arg im(y, R_k) \quad (18)$$

Note that the utility and marginal utility using full information in y may always be greater than the utility and marginal utility using partial information in y where $U(d_t, S_t, P_b, P)$ represents the utility function for any service provider. That is, let $y = (y_1, y_2)$, in which case:

$$E\{v(y_1, y_2) | y_k\} \geq v(y_k) \quad (19)$$

From Eqn. (19), it can be inferred that the utility and marginal utility in a complete information set is always greater than the utility and marginal utility of marginal utility in an in-complete information set.

The network resource cost for premium user accessing the multi-tenant network can be calculated as follows:

$$RC_{prem} = D_{avg}C_{incr} + P_{prem}d_i \quad (20)$$

Similarly, for enterprise (or non-premium) users:

$$RC_{ent} = D_{avg}C_{incr} + P_{ent}d_i \quad (20)$$

Here, $D_{avg}$ represents the average amount of data sent from the IoT devices to the data center. Also, $C_{incr}$ is the maintenance cost of data center network devices. It is also inferred that RC will always have a minimum value based on the nature of other decision attributes.

The dependence of utility of service providers on these parameters can be illustrated as follows:

$$\frac{\partial U(d_t, S_t, P_b, P)}{\partial d_t} \leq 0 \quad (22)$$

This means when demand $d_t$ increases, the utility of the service provider decreases.

$$\frac{\partial U(d_t, S_t, P_b, P)}{\partial S_t} \leq 0 \quad (23)$$

In addition, the utility of service provider U(·) increases as the supply or available network resources increases.

$$\frac{\partial U(d_t, S_t, P_b, P)}{\partial P_b} \leq 0 \quad (24)$$

That is, the utility is directly proportional to the base price. However, note that in most cases the base price may remain constant.

$$\frac{\partial U(d_t, S_t, P_b, P)}{\partial P} \leq 0 \quad (25)$$

Here also the actual price incurred by the user may cause a direct increase in a service provider's utility.

Algorithm 2 uses queue max data rate r, the flow entry price sum and QoS parameters to do the queue selection for a given flow entry. This selection may be done dynamically using the QoS SLA parameters (as shown in step 9) and price sum values. According to some embodiments, the QoS SLA parameters may even include multiple parameters (such as bandwidth and delay). Note that multiple QoS parameters might be accommodated within single variable by multiplying weights to the parameters (and then summing up).

| Algorithm 2: Queue Selection | | |
|---|---|---|
| | Inputs: | ERP-IoT Flow Entry set on switch set S – f ∈ F |
| | | Price Sum for each f – $P_r$ |
| | | all configured Queues q ∈ Q |
| | Outputs: | Selected Queue Set C[F][Q] |
| 1 | for ∀q ∈ Q do | |
| 2 |    for w=0 to DataRate[q] do | |
| 3 |       C[0,w] =0; | |
| 4 |    for i=0 to |F| do | |
| 5 |       C[i,0] =0; | |
| 6 |    for i=0 to |F| do | |
| 7 |       for w=0 to DataRate[q] do | |
| 8 |          if $QoS_{BW}[f_{i-1}] \leq$ w then | |
| 9 |             C[i][w] = Max($P_r$[F[i − 1]] + C[i − 1][w − $QoS_{BW}$(F[i − 1], C[i − 1][w]) | |
| 10 |          else | |
| 11 |             C[i][w] = C[i − 1][w] | |

```
Algorithm 2: Queue Selection

|    |    |_
        |    |_
        |_
12   return C;
```

Figure 7:
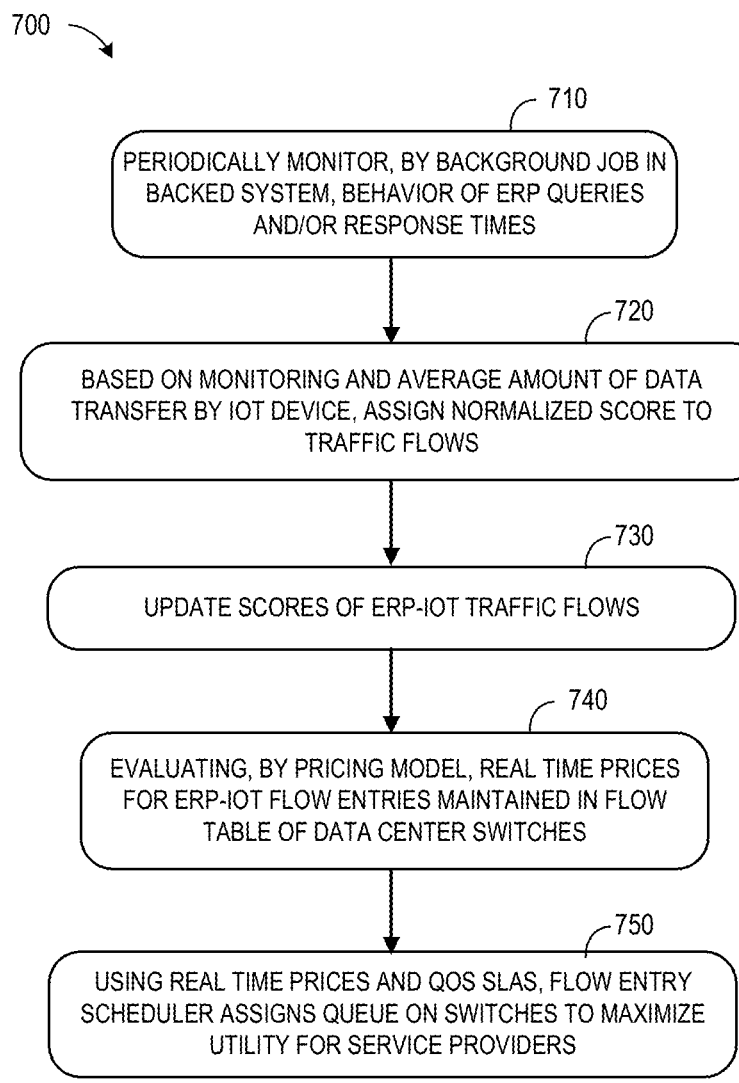
FIG. 7 is a multi-tenant software defined data center network traffic management method according to some embodiments.

FIG. 7 illustrates a method 700 according to some embodiments. At 710, the behavior of ERP queries and associated response times (associated with a number of traffic flows) may be periodically monitored by one or more background jobs in a backend system. Based on the real-time monitoring (and an average amount of data transfer by an IoT device) a normalized score may be assigned to each traffic flow at 720. The background job may then at 730 periodically update the scores of ERP-IoT flows. According to some embodiments, these scores are used by a pricing module in substantially real-time to evaluate prices.

Using the calculated scores, a pricing module (e.g., Algorithm 1) may evaluate the substantially real-time prices for ERP-IoT flow entries maintained in data center switch flow table at 740. At 750, using the substantially real-time prices and QoS SLAB, a flow entry scheduler (e.g., Algorithm 2) may assign a queue on the switches for normal operations. This scheduler may, according to some embodiments, aim to maximize utility for ERP-IoT service providers.

Figure 8:
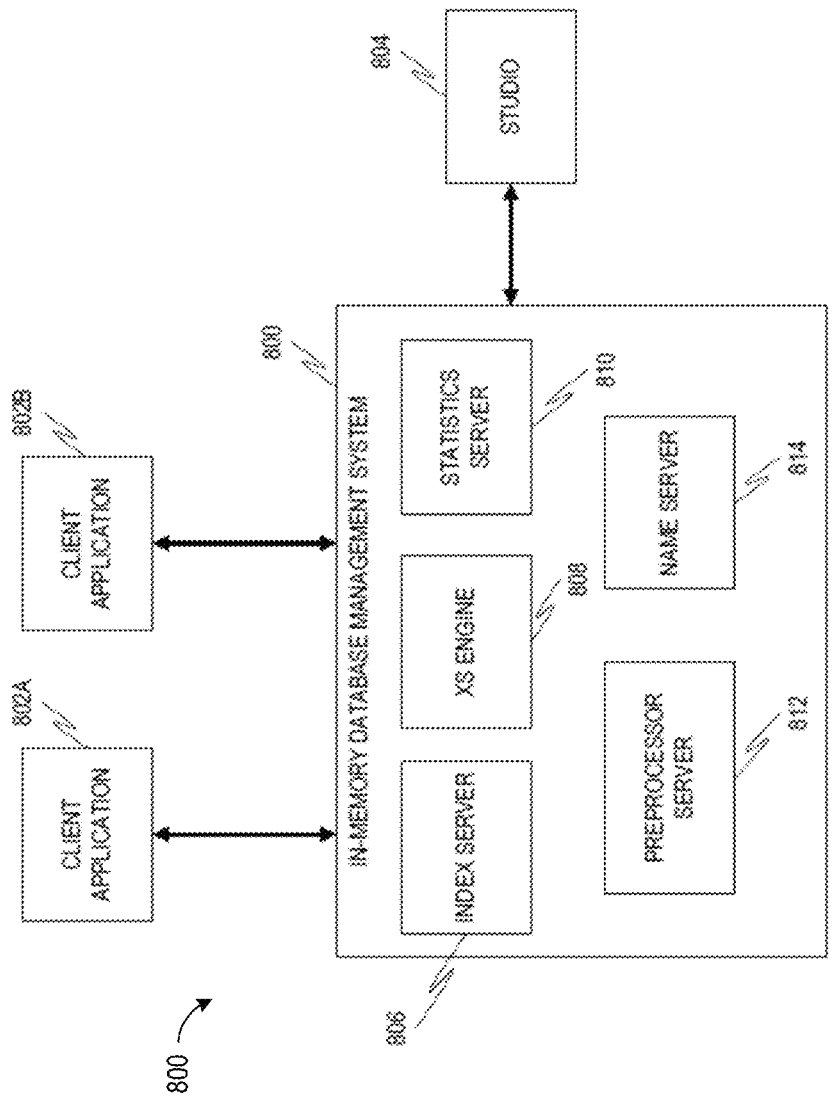
FIG. 8 is a diagram illustrating an example of an in-memory database management system 800 that may be used to implement a web application in some examples of the network virtualization systems and methods described herein.

FIG. 8 is a diagram illustrating an example of an in-memory database management system 800 that may be used to implement a web application in some examples of the network virtualization systems and methods described herein. An in-memory database stores data primarily at main memory, such as a Random Access Memory ("RAM"). This is different than databases that primarily employ a disk storage mechanism. In some examples, the database management system 800 may be or include an example of the HANA system from SAP SE of Waldorf, Germany. Although various features of web applications are described herein in the context of an in-memory database, network virtualization for web application queries may be generally performed for any type of web application using any suitable type of database.

The in-memory database management system 800 may be coupled to one or more client applications 802A, 802B. For example, client applications 802A, 802B may be examples of the web application 132 described herein. Client applications 802A, 802B may execute one or more queries utilizing data from the database including, for example, presenting a user interface (UI) to one or more users, entering data, accessing data, etc. The client applications 802A, 802B may communicate with the in-memory database management system 800 through a number of different protocols, including Structured Query Language ("SQL"), Multidimensional Expressions ("MDX"), Hypertext Transfer Protocol ("HTTP"), Representational State Transfer ("REST"), Hypertext Markup Language ("HTML"), etc.

FIG. 8 also shows a studio 804 that may be used to perform modeling by accessing the in-memory database management system 800. In some examples, the studio 804 may allow complex analysis to be performed on data drawn not only from real-time event data and windows, but also from stored database information.

The in-memory database management system 800 may comprise a number of different components, including an index server 806, an XS engine 808, a statistics server 810, a preprocessor server 812, and a name server 814. These components may operate on a single computing device, or may be spread among multiple computing devices (e.g., separate servers). The index server 806 contains the actual data and the engines for processing the data. It may also coordinate and uses the other servers.

The XS engine 808 allows clients to connect to the in-memory database management system 800 using web protocols, such as HTTP. Although the XS engine 808 is illustrated as a component of the in-memory database management system 800, in some examples, the XS engine may be implemented as one or more Application Program Interfaces (APIs) and/or services positioned between the client applications 802A, 802B and the in-memory database management system 800. For example, the XS engine 808 may be configured to perform the functions of the privilege filter 118 for client requests received in languages other than SQL such as, for example, MDX, HTTP, REST, HTML, etc.

The statistics server 810 collects information about status, performance, and resource consumption from all the other server components. The statistics server 810 can be accessed from the studio 804 to obtain the status of various alert monitors. The preprocessor server 812 is used for analyzing text data and extracting the information on which the text search capabilities are based. The name server 814 holds information about the database topology. This is used in a distributed system with instances of the database on different hosts. The name server 814 knows where the components are running and which data is located on which server. In an example embodiment, a separate enqueue server may operate in the manner described above with respect to enqueue servers, specifically with regard to creating and managing light-weight enqueue sessions.

Figure 9:
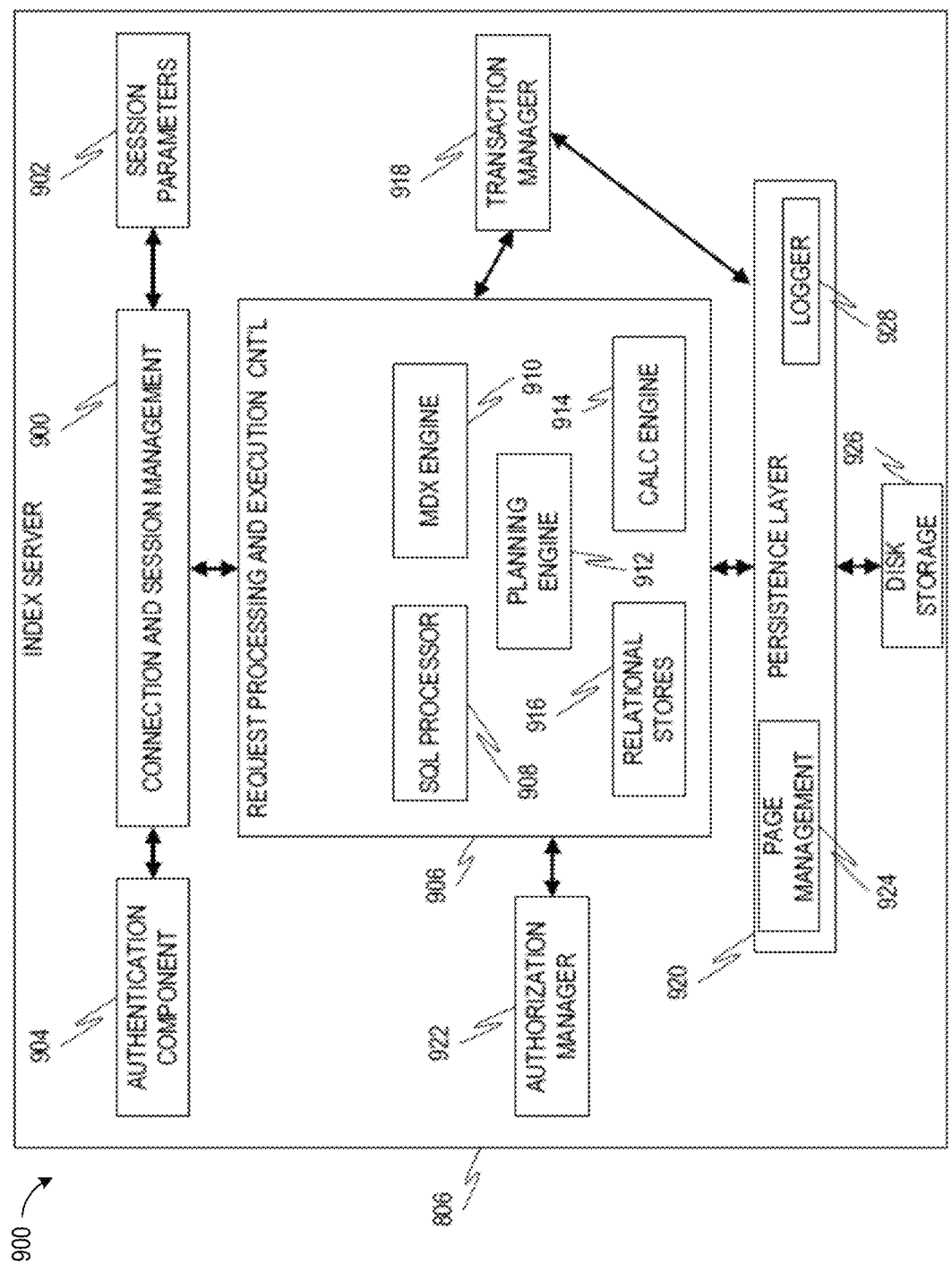
FIG. 9 is a diagram illustrating an example of the index server of FIG. 8.

The index server 806, in some examples, may house an instance of the privilege filter 118. The instance of the privilege filter 118 at the index server 806 may be in addition to or instead of the instance of the privilege filter 118 at the XS engine 808. FIG. 9 is a diagram illustrating an example of the index server 806. Specifically, the index server 806 of FIG. 8 is depicted in more detail. The index server 806 includes a connection and session management component 900, which is responsible for creating and managing sessions and connections for the database clients (e.g. client applications 802A, 802B). Once a session is established, clients can communicate with the database system using SQL statements. For each session, a set of session parameters 902 may be maintained, such as auto-commit, current transaction isolation level, etc. Users (e.g., system administrators, developers) may be authenticated by the database system itself (e.g., by logging in with log-in information such as a user name and password, using an authentication component 904) or authentication can be delegated to an external authentication provider such as a Lightweight Directory Access Protocol ("LDAP") directory.

Client queries can be analyzed and executed by a set of components summarized as request processing and execution control 906. An SQL processor 908 checks the syntax and semantics of the client SQL statements and generates a logical execution plan. MDX is a language for querying and manipulating multidimensional data stored in OLAP cubes. As such, an MDX engine 910 may be provided to allow for the parsing and executing of MDX commands. A planning engine 912 allows applications to execute basic planning operations in the database layer. One such operation is to create a new version of a dataset as a copy of an existing dataset, while applying filters and transformations.

A calculation engine 914 implements the various SQL script and planning operations. The calculation engine 914 creates a logical execution plan for calculation models derived from SQL script, MDX, planning, and domain-specific models. This logical execution plan may include, for example, breaking up a model into operations that can be processed in parallel. The data is stored in relational stores 916, which implement a relational database in main memory. Each SQL statement may be processed in the context of a transaction. New sessions are implicitly assigned to a new transaction. A transaction manager 918 may coordinate database transactions, controls transactional isolation, and keeps track of running and closed transactions. When a transaction is committed or rolled back, the transaction manager 918 informs the involved engines about this event so they can execute needed actions. The transaction manager 918 also cooperates with a persistence layer 920 to achieve atomic and durable transactions.

An authorization manager 922 is invoked by other database system components to check whether the user has the specified privileges to execute the requested operations. The database system allows for the granting of privileges to users or roles. A privilege grants the right to perform a specified operation on a specified object.

The persistence layer 920 ensures that the database is restored to the most recent committed state after a restart and that transactions are either completely executed or completely undone. To achieve this goal in an efficient way, the persistence layer 920 uses a combination of write-ahead logs, shadow paging, and save points. The persistence layer 920 also offers a page management interface 924 for writing and reading data to a separate disk storage 926, and also contains a logger 928 that manages the transaction log. Log entries can be written implicitly by the persistence layer 920 when data is written via the persistence interface or explicitly by using a log interface.

Figure 10:
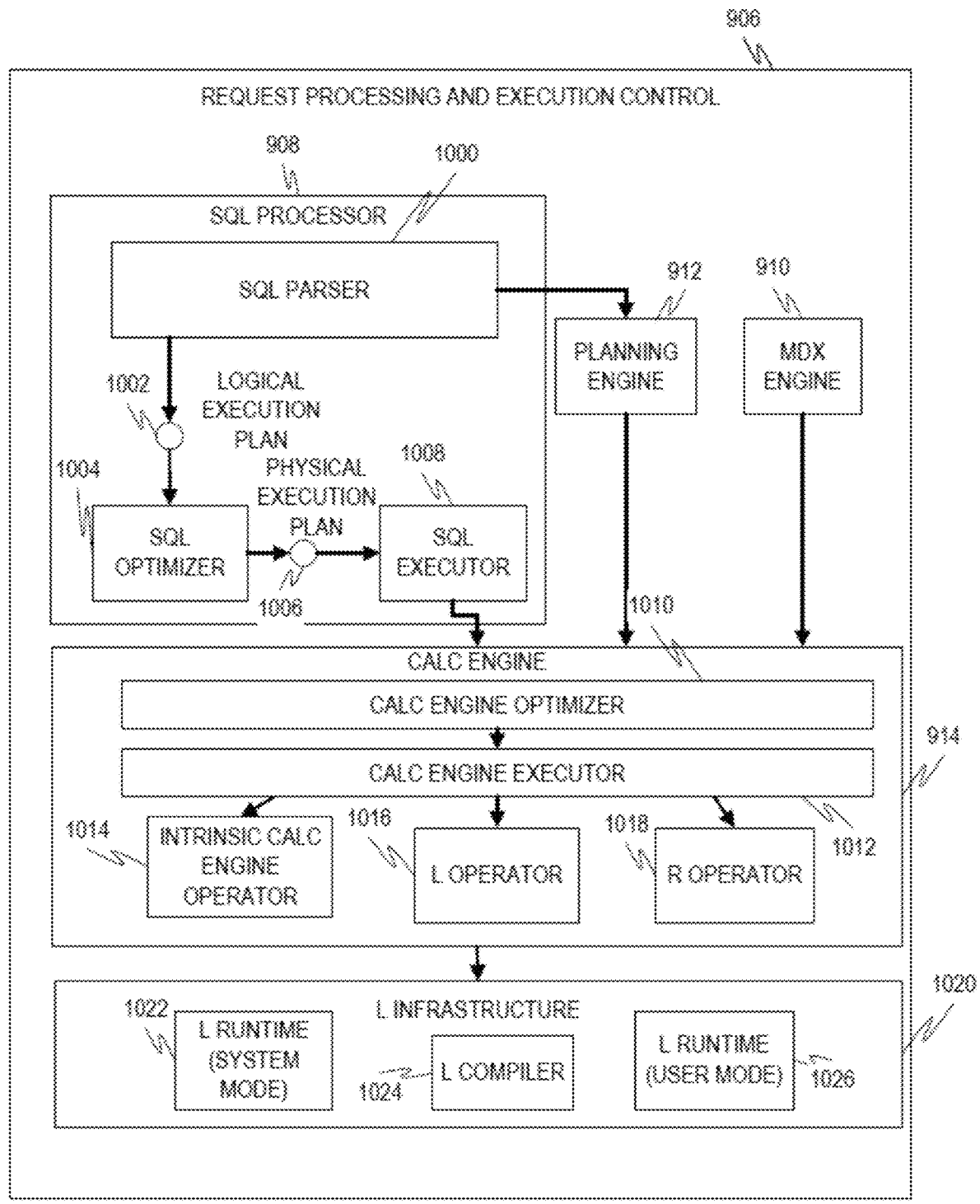
FIG. 10 is a diagram illustrating one example of the request processing and execution control of FIG. 9.

FIG. 10 is a diagram illustrating one example of the request processing and execution control 906. This diagram depicts the request processing and execution control 906 of FIG. 9 in more detail. The SQL processor 908 contains an SQL parser 1000, which parses the SQL statement and generates a logical execution plan 1002, which it passes to an SQL optimizer 1004. The SQL optimizer 1004 optimizes the logical execution plan 1002 and converts it to a physical execution plan 1006, which it then passes to a SQL executor 1008. The calculation engine 914 implements the various SQL script and planning operations, and includes a calc engine optimizer 1010, which optimizes the operations, and a calc engine executor 1012, which executes the operations, as well as an intrinsic calc engine operator 1014, an L operator 1016, and an R operator 1018.

An L infrastructure 1020 includes a number of components to aid in the running of L procedures, including an L-runtime (system mode) 1022, an L compiler 1024, and an L-runtime (User mode) 1026.

Figure 11:
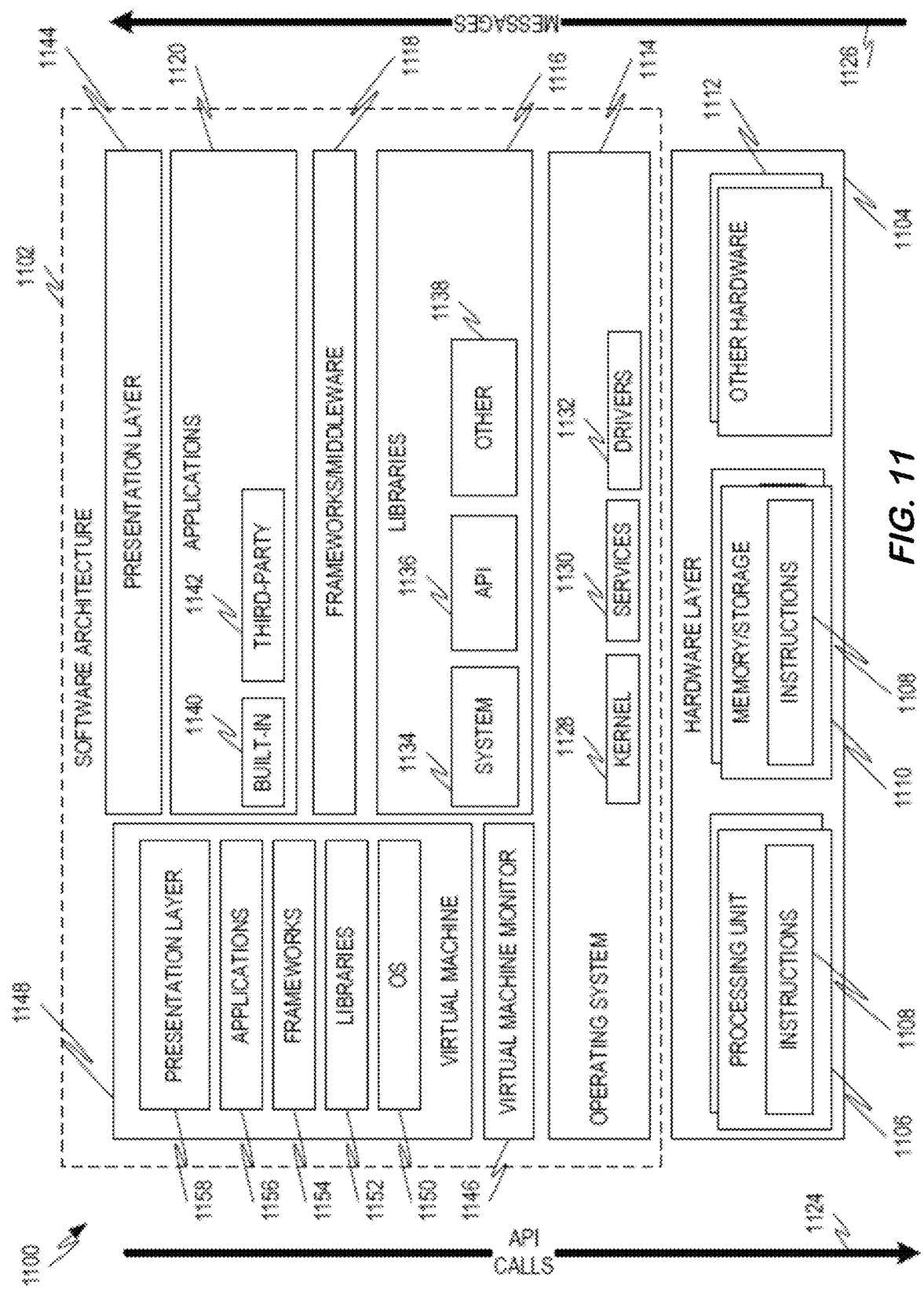
FIG. 11 is a block diagram showing one example of a software architecture for a computing device.

FIG. 11 is a block diagram 1100 showing one example of a software architecture 1102 for a computing device. The architecture 1102 may be used in conjunction with various hardware architectures, for example, as described herein. FIG. 11 is merely a non-limiting example of a software architecture and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system 1200 of FIG. 12.

The representative hardware layer 1104 comprises one or more processing units 1106 having associated executable instructions 1108. Executable instructions 1108 represent the executable instructions of the software architecture 1102, including implementation of the methods, modules, subsystems, and components, and so forth described herein and may also include memory and/or storage modules 1110, which also have executable instructions 1108. Hardware layer 1104 may also comprise other hardware as indicated by other hardware 1112 which represents any other hardware of the hardware layer 1104, such as the other hardware illustrated as part of computer system 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120 and presentation layer 1144. Operationally, the applications 1120 and/or other components within the layers may invoke application programming interface (API) calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the architecture 1102 to pause its current processing and execute an Interrupt Service Routine ("ISR") when an interrupt is accessed.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus ("USB") drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system 1134 libraries (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules. In some examples, libraries 1138 may provide one or more APIs serviced by a message oriented middleware.

The frameworks 1118 (also sometimes referred to as middleware) may provide a higher-level common infrastructure that may be utilized by the applications 1120 and/or other software components/modules. For example, the frameworks 1118 may provide various GUI functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 includes built-in applications 1140 and/or third-party applications 1142. Examples of representative built-in applications 1140 may include, but are not limited to, a contacts application, a browser application, a book reader application, a location application, a media application, a messaging application, and/or a game application. Third-party applications 1142 may include any of the built-in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™ Windows® Phone, or other mobile computing device operating systems. In this example, the third-party application 1142 may invoke the API calls 1124 provided by the mobile operating system such as operating system 1114 to facilitate functionality described herein.

The applications 1120 may utilize built-in operating system functions (e.g., kernel 1128, services 1130 and/or drivers 1132), libraries (e.g., system 1134, APIs 1136, and other libraries 1138), frameworks/middleware 1118 to create user interfaces to interact with users of the system. Alternatively, or additionally, in some systems interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine as well as the interface with the host operating system (i.e., operating system 1114). A software architecture executes within the virtual machine such as an operating system 1150, libraries 1152, frameworks/middleware 1154, applications 1156 and/or presentation layer 1158. These layers of software architecture executing within the virtual machine 1148 can be the same as corresponding layers previously described or may be different.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a Field Programmable Gate Array ("FPGA") or an Application-Specific Integrated Circuit ("ASIC")) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Figure 12:
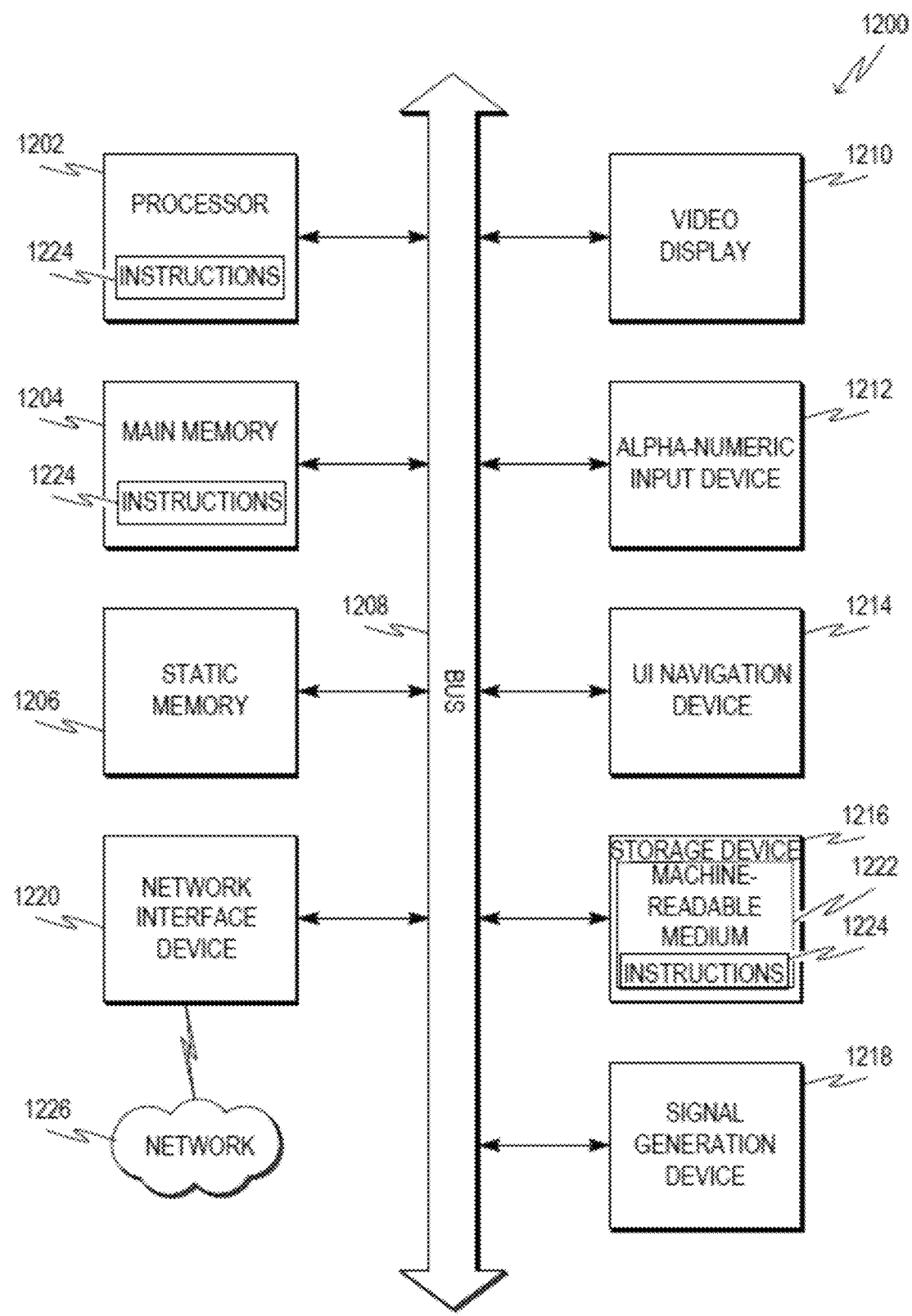
FIG. 12 is a block diagram of a machine in the example form of a computer system within which instructions may be executed for causing the machine to perform any one or more of the methodologies discussed herein.

FIG. 12 is a block diagram of a machine in the example form of a computer system 1200 within which instructions 1224 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer ("PC"), a tablet PC, a set-top box, a Personal Digital Assistant ("PDA"), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a Central Processing Unit ("CPU"), a graphics processing unit, or both), a main memory 1204, and a static memory 1206, which communicate with each other via a bus 1208. The computer system 1200 may further include a video display unit. The computer system 1200 also includes an alphanumeric input device 1212 (e.g., a keyboard or a touch-sensitive display screen), a UI navigation (or cursor control) device 1214 (e.g., a mouse), a disk drive unit 1216, a signal generation device 1218 (e.g., a speaker), and a network interface device 1220.

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting machine-readable media 1222.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of machine-readable media 1222 include non-volatile memory, including by way of example semiconductor memory devices, e.g., Erasable Programmable Read-Only Memory ("EPROM"), Electrically Erasable Programmable Read-Only Memory ("EEPROM"), and flash memory devices; magnetic disks such as internal hard disks and removable disks; magneto-optical disks; and CD-ROM and DVD-ROM disks.

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a Local Area Network ("LAN"), a Wide Area Network ("WAN"), the Internet, mobile telephone networks, Plain Old Telephone Switching ("POTS") networks, and wireless data networks (e.g., WiFi and WiMax networks). The term "transmission medium" shall be taken to include any intangible medium that is capable of storing, encoding, or carrying instructions 1224 for execution by the machine, and includes digital or analog communications signals or other intangible media to facilitate communication of such software.

In this way, embodiments might utilze a pricing model to improve traffic flow management at a data center. To simulate performance of such a pricing mode, A Java-based Floodlight controller might be utilized. In the network layer, we have 7 extreme switches might be configured with OpenFlow 1.3, and a total of 32 hosts (for simulating IoT gateway) may be connected to the switches. Moreover, ten 10 VMs may be configured to receive ERP-IoT transaction requests, and each time slot may be selected to have a value of thirty seconds. At the start of a time slot, a backend running on VMs may evoke the price calculation and flow entry scheduler modules. In the extreme switches, six queues may be configured on each egress and ingress physical ports and forty distinct user manufacturing locations may fire IoT traffic from IoT gateways to the backend VM. The proposed pricing model might be compared to, for example:

Single Queue Operations ("SQO") where all the switches do not have multiple queues configured, rather only single queue. In this model, there is no need for a scheduler (because all the flow entries are assigned a single default queue).

Multiple Queue with Static Flow Entry Assignment Operation ("MQSO") where six queues are configured and the assignment of flow entries to queues are static and remains same throughout the simulation.

The link and queue utilization may be calculated using standard OpenFlow traffic statistics collection modules. Moreover, a user satisfaction may be measured as the ratio between network resource availability and demand. Based on this analogy, the user satisfaction factor may be calculated as:

$$S_F(\cdot) = \frac{\lambda_i}{d_i} \tag{26}$$
$$= \frac{\{d_i\} - \{w_k - \sum_{i=1}^{q} r_i \cdot f_k\}}{\{d_i\}}$$
$$= 1 - \frac{\{w_k - \sum_{i=1}^{q} r_i \cdot f_k\}}{\{d_i\}}$$

A service provider resource satisfaction may represent a measure of actual traffic utilization with respect to individual queue utilization. Simulation of embodiments described herein show that the proposed scheme outperforms other schemes. Resource satisfaction may be calculated as follows:

$$\text{Satisfaction} = 100 - \frac{Link_{Util} - Queue_{Util}}{Link_{Util}} \cdot 100 \tag{27}$$

According to some embodiments, overall utility of a service provider bay increase by more than 19 percent.

Some embodiments described herein utilize a distributed and dynamic pricing method to maximize a service providers utility with respect to incurred prices for ERP-IoT traffic flows and network resource utilization. This pricing model may be based on demand and supply principles, and the prices of the ERP-IoT flows may be assigned based on a substantially real-time bandwidth requirement and resource availability. The service providers utility maximization may be solved using non-linear optimization techniques. Some embodiments have been described with respect to a network multi-tenancy architecture for ERP-IoT flows that generate from IoT gateways and traverse through a ERP backend server. Note, however, that embodiments might be utilized to price network based multi-tenancy between ERP backend VMs and database VMs.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Figure 13:
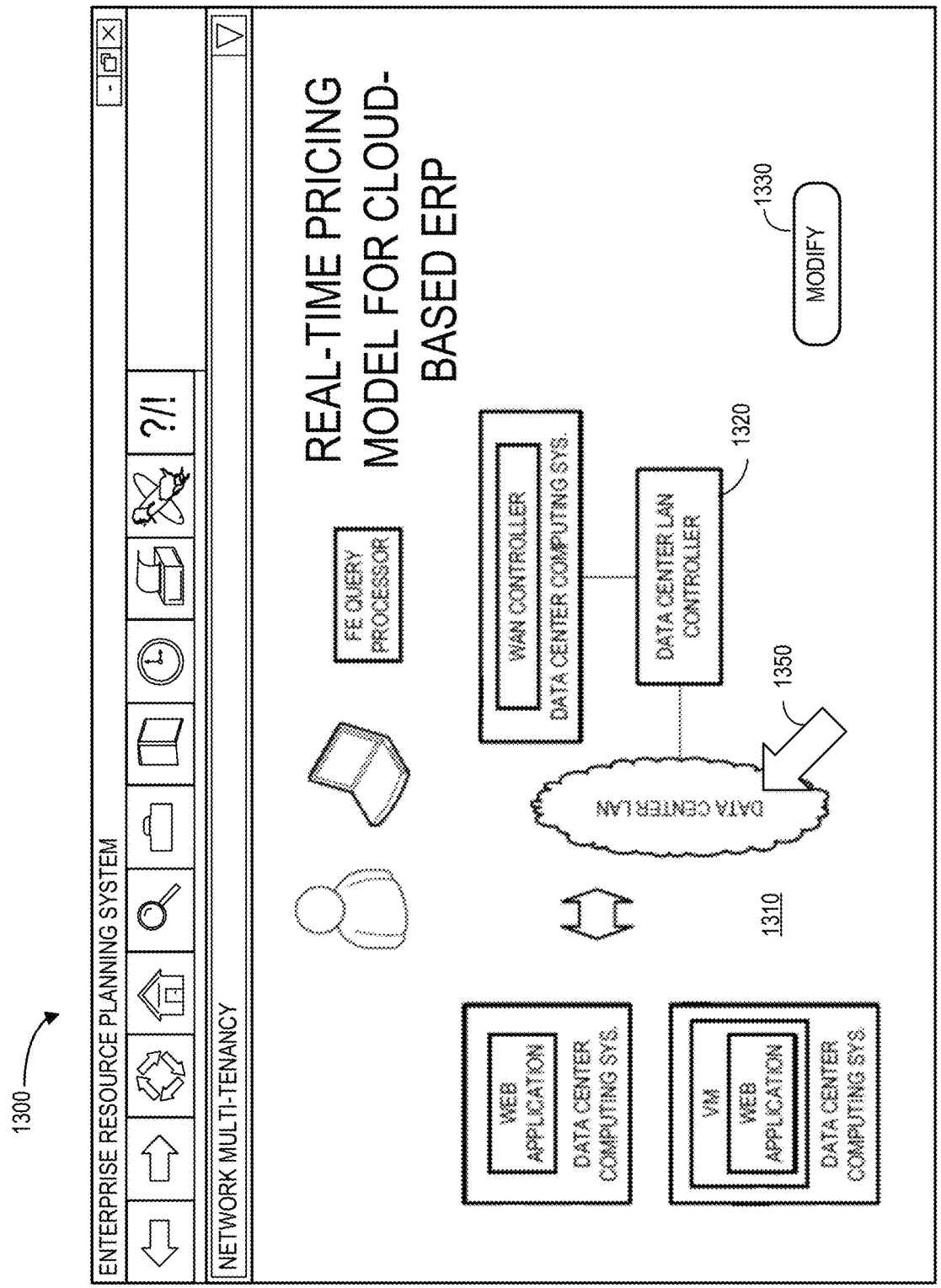
FIG. 13 is a real-time pricing model for cloud based ERP display in accordance with some embodiments.

Some embodiments have been described with respect to ERP solutions but embodiments may be associated with other types of cloud based data center solutions. Moreover, information may be provided (e.g., to an operator or administrator) in any number of different ways. For example, FIG. 13 illustrates an interactive Graphical User Interface ("GUI") display 1300 that might display information about network multi-tenancy for a cloud based ERP according to some embodiments. The display 1300 includes a graphic representation 1310 of elements of a data center (e.g., a query processor, data center computing system, data center LAN controller 1320, etc.). Selection of portions of the graphic representation 1310 (e.g., by touchscreen or computer mouse pointer 1350) may result in the display of additional information about an element and/or allow an operator to adjust a parameter associated with the data center. Similarly, selection of a "Modify" icon 1330 may also let the user alter or adjust operation of the data center (e.g., by changing a number of queues that are available, altering response time input parameters or pricing weights, etc.).

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer system for multi-tenant software defined data center network traffic management, comprising:
    a data center computing system comprising at least one computer processor and at least one memory in communication with the at least one processor, wherein the data center computing system is associated with an Enterprise Resource Planning ("ERP") solution, deployed via a cloud environment and provided to a premium user and an enterprise user via a Software as a Service ("SaaS") solution, and programmed to perform operations including:
        calculating a first value for a first traffic flow, associated with the premium user, using a dynamic, distributed real-time pricing model that utilizes an overall response time and an average amount of data associated with the first traffic flow;
        calculating a second value for a second traffic flow, associated with the enterprise user, using the dynamic, distributed real-time pricing model that utilizes an overall response time and an average amount of data associated with the second traffic flow;
        dynamically allocating network resources to the first and second traffic flows based on the first and second values; and
        arranging for the allocated network resources to process the first and second traffic flows in connection with the ERP SaaS solution; and
    a traffic flow scheduler executing a queue selection algorithm to meet Service Level Agreements ("SLAs") responsive to elastic user demand and resource availability,
    wherein different mechanisms are utilized to evaluate values for the premium and enterprise users and the dynamic, distributed real-time pricing model calculates real-time price values using a fixed base price, a load fraction, a difference between demand and supply, and an average amount of packets in a traffic flow.

2. The system of claim 1, wherein the first and second traffic flows are associated with Internet of Things ("IoT") applications executing direct transactions of the ERP solution.

3. The system of claim 1, wherein the data center computing system configures multiple rate-limited queues on egress and ingress ports of devices associated with the data center.

4. The system of claim 1, wherein a price is negative when a network resource supply is less than a current demand.

5. The system of claim 1, wherein the dynamic allocation of network resources is to improve network bandwidth utilization at the network layer with respect to multi-tenancy.

6. The system of claim 1, wherein the dynamic, distributed real-time pricing model calculates real-time price values $P_t$ using, when demand is less than supply:

$$P_t = P_b + L(\alpha_i) + \tan^{-1}\{e^\lambda - \gamma\}$$

where $P_b$ represents the fixed base price, $L(\alpha_i)$ represents the load fraction, $\lambda$ represents the difference between demand and supply, and $\gamma$ represents the average amount of packets in a traffic flow; and
    enterprise price values $P_{ent}$ using, when demand is more than supply:

$$P_{ent} = P_b - L(\alpha_i) + \tan^{-1}\{e^\lambda - \gamma\}.$$

7. A computerized method for multi-tenant software defined data center network traffic management associated with an Enterprise Resource Planning ("ERP") solution, deployed via a cloud environment and provided to a premium user and an enterprise user via a Software as a Service ("SaaS") solution, comprising:
    calculating, by a data center computing system including at least one computer processor and at least one memory in communication with the at least one processor, a first value for a first traffic flow, associated with the premium user, using a dynamic, distributed real-time pricing model that utilizes an overall response time and an average amount of data associated with the first traffic flow;
    calculating a second value for a second traffic flow, associated with the enterprise user, using the dynamic, distributed real-time pricing model that utilizes an overall response time and an average amount of data associated with the second traffic flow;
    dynamically allocating network resources to the first and second traffic flows based on the first and second values;
    arranging for the allocated network resources to process the first and second traffic flows in connection with the ERP SaaS solution; and
    executing, by a traffic flow scheduler a queue selection algorithm to meet Service Level Agreements ("SLAs") responsive to elastic user demand and resource availability,
    wherein different mechanisms are utilized to evaluate values for the premium and enterprise users and the dynamic, distributed real-time pricing model calculates real-time price values using a fixed base price, a load fraction, a difference between demand and supply, and an average amount of packets in a traffic flow.

8. The method of claim 7, wherein the first and second traffic flows are associated with Internet of Things ("IoT") applications executing direct transactions of the ERP solution.

9. The method of claim 7, wherein the data center computing system configures multiple rate-limited queues on egress and ingress ports of devices associated with the data center.

10. A non-transitory, machine-readable medium comprising instructions thereon that, when executed by a computer processor, cause the processor to execute operations, for multi-tenant software defined data center network traffic management associated with an Enterprise Resource Planning ("ERP") solution, deployed via a cloud environment and provided to a premium user and an enterprise user via a Software as a Service ("SaaS") solution, comprising:
    calculating, by a data center computing system including at least one processor and at least one memory in communication with the at least one processor, a first value for a first traffic flow, associated with the premium user, using a dynamic, distributed real-time pricing model that utilizes an overall response time and an average amount of data associated with the first traffic flow;

calculating a second value for a second traffic flow, associated with the enterprise user, using the dynamic, distributed real-time pricing model that utilizes an overall response time and an average amount of data associated with the second traffic flow;

dynamically allocating network resources to the first and second traffic flows based on the first and second values;

arranging for the allocated network resources to process the first and second traffic flows in connection with the ERP SaaS solution; and executing, by a traffic flow scheduler a queue selection algorithm to meet Service Level Agreements ("SLAs") responsive to elastic user demand and resource availability, wherein different mechanisms are utilized to evaluate values for the premium and enterprise users and the dynamic, distributed real-time pricing model calculates real-time price values using a fixed base price, a load fraction, a difference between demand and supply, and an average amount of packets in a traffic flow.

11. The medium of claim 10, wherein a value is negative when a network resource supply is less than a current demand.

12. The medium of claim 10, wherein the dynamic allocation of network resources is to improve network bandwidth utilization at the network layer with respect to multi-tenancy.

* * * * *